(12) United States Patent
Share et al.

(10) Patent No.: US 10,514,678 B2
(45) Date of Patent: Dec. 24, 2019

(54) METHOD FOR LEVELING A 3-D PRINTING PLATFORM AND A 3-D PLATFORM WITH ADJUSTABLE LEVEL

(71) Applicant: Robert Bosch Tool Corporation, Broadview, IL (US)

(72) Inventors: Eli Charles Share, Northfield, IL (US); Daniel John Blythe, Palatine, IL (US); Gregory Andrew Herman, Elk Grove Village, IL (US); Brittany Nichole Hopper, Chicago, IL (US)

(73) Assignee: Robert Bosch Tool Corporation, Broadview, IL (US)

( * ) Notice: Subject to any disclaimer, the term of this patent is extended or adjusted under 35 U.S.C. 154(b) by 483 days.

(21) Appl. No.: 15/195,456

(22) Filed: Jun. 28, 2016

(65) Prior Publication Data
US 2017/0371317 A1 Dec. 28, 2017

(51) Int. Cl.
*G05B 19/4099* (2006.01)
*B33Y 30/00* (2015.01)
(Continued)

(52) U.S. Cl.
CPC ........ *G05B 19/4099* (2013.01); *B29C 64/245* (2017.08); *B29C 64/393* (2017.08); *B29C 64/40* (2017.08); *B33Y 30/00* (2014.12); *B33Y 40/00* (2014.12); *B33Y 50/02* (2014.12); *B29L 2031/7502* (2013.01); *G05B 2219/49019* (2013.01)

(58) Field of Classification Search
CPC . B29C 64/245; B29C 64/393; B29C 67/0092; B29L 2031/7502; B33Y 30/00
See application file for complete search history.

(56) References Cited

U.S. PATENT DOCUMENTS

| 2010/0032996 A1* | 2/2010 | Lee ............................ B62J 1/00 297/195.1 |
| 2010/0156158 A1* | 6/2010 | LaPointe ................ A47C 7/465 297/284.7 |

(Continued)

OTHER PUBLICATIONS

International Search Report dated Oct. 12, 2017, of the corresponding International Application PCT/EP2017/065779 filed Jun. 27, 2017.

*Primary Examiner* — John W Lee
(74) *Attorney, Agent, or Firm* — Norton Rose Fulbright US LLP

(57) ABSTRACT

An adjustable level 3-D printing platform includes a platform, three support posts, and an adjusting component by which heights of the three support posts are adjustable. The bottom of the build platform includes at least one socket to engage with a ball end of one of the three support posts, thereby enabling two point leveling. The adjusting component is configured to simultaneously adjust a height of the at least three support posts using a first arm and a second arm, each connected to the build platform at respective pivot points and configured to apply respective clamping forces to the support posts. The printing platform further includes at least one sensor leveling system that deploys a probe, measures a relative probe state, and compares the measurement to a predetermined value. During the leveling processes, the 3-D printer is configured to provide sensory feedback.

16 Claims, 15 Drawing Sheets

(51) Int. Cl.
*B33Y 40/00* (2015.01)
*B33Y 50/02* (2015.01)
*B29C 64/393* (2017.01)
*B29C 64/245* (2017.01)
*B29C 64/40* (2017.01)
*B29L 31/00* (2006.01)

(56) References Cited

U.S. PATENT DOCUMENTS

| | | | |
|---|---|---|---|
| 2015/0130100 A1 | 5/2015 | Fiegener | |
| 2015/0276119 A1* | 10/2015 | Booker | B29C 64/106 248/561 |
| 2016/0089838 A1 | 3/2016 | Atwood | |
| 2018/0056606 A1* | 3/2018 | Hoffman | B29C 64/106 |

* cited by examiner

Fig. 14

METHOD FOR LEVELING A 3-D PRINTING PLATFORM AND A 3-D PLATFORM WITH ADJUSTABLE LEVEL

FIELD OF THE INVENTION

The present invention relates generally to leveling a three-dimensional ("3-D") printing platform, and more specifically, to configurations of the 3-D printing platform that enable leveling of the platform.

BACKGROUND

3-D printing, or additive manufacturing, is a process of making three dimensional solid objects based on blueprints provided by digital files. The synthesis of the desired 3-D solid object is achieved by strategically generating successive layers of an additive material in a pattern on a platform of a 3-D printer until the entire object is created. The synthesis of the 3-D object is driven by the digital files that provide the specifications that describe how to create the pattern of layers and the materials used to generate the object. The digital files specifying the design are provided by the user, and the digital files read by the 3-D printer may include G-code files, computer-aided design ("CAD") files, STereoLithography ("STL") CAD files, or other file types generally used in additive manufacturing processes. In some instances, the digital files refer to a 3-D model of a new object, but alternatively, the digital files can refer to a copy of an object derived from the usage of a 3-D scanner.

The generation of the successive layers of the additive material can be performed, for example, according to any one of: (1) Vat Photopolymerisation, (2) Material Jetting, (3) Binder Jetting, (4) Direction Energy Deposition, (5) Powder Bed Fusion, (6) Sheet Lamination, or (7) Material Extrusion. Specific processes of Material Extrusion used to generate the successive layers can involve making sequential deposits using fused deposition modeling ("FDM"), fused filament fabrication ("FFF"), or Direct Ink Writing ("DIW").

The materials used as the "ink" of the 3-D printer to generate the 3-D object can include, for example, any of: powder material, polymer material, thermoplastics, eutectic metals, edible materials, rubbers, modeling clay, plasticine, metal clay, ceramic materials, metal alloys, papers, composite materials composed of ceramics and metallic materials ("cermet"), metal matrix composites, ceramic matrix composites, photopolymers, plaster, stainless steel, aluminum, plastic film, and metal foil.

3-D printers are generally protected from external influences by a build cage, and, within the build cage, the 3-D printer includes at least a build platform on which the synthesis process is executed. Before building (printing) a 3-D object on the build platform, the build platform (or build plate) should be set to a level state.

Particularly in applications in which the accuracy of the 3-D object generated is of concern, the initialization process and achievement of a level state build platform is crucial. Moreover, in some applications, the build platform must not only be initialized to a level state, but must also maintain a level state throughout the duration of the printing process despite the weight and or placement of the ink deposits on the build platform. Conventional build platform systems use either error correction techniques to compensate for a non-level build platform or rudimentary mechanical leveling techniques to attempt to achieve a level state of the build platform.

A first type of conventional build platform systems uses a sensor to sense unevenness of a build platform, and then, based on the sensed state of the build platform, alters code included in a digital file to compensate for the non-level build platform, which code is then executed for synthesis of the 3-D product. However, the final product generated based on the altered code is not desirable for some applications because, despite the code alteration, the base of the resulting 3-D object is not entirely flat. In addition, due to the offset of the pattern provided at the base of the 3-D object, additional offset error is propagated vertically throughout the entire printed 3-D object. This error occurs because the alteration provided in the code corrects for an error but does not actually fix the error in the level state of the build platform. The build platform itself remains in a non-level state throughout the synthesis of the 3-D object using the first type of conventional build platform system.

A second type of conventional build platform systems requires high levels of user interaction or skill. FIG. 1 is a perspective view of such a 3-D printer system 100 that includes an adjustable build platform. 3-D printer system 100 includes a surface 110, which is the top of a build platform 108. For an accurate printing process, the surface 110 should ideally be level relative to an extruder head 112. To level the top surface 110, supporting posts 102, 104, and 106 of the build platform 108 should be adjusted. The 3-D printer is generally enclosed in a build cage 114, which typically has a single access door near the front supporting posts 102 and 104.

FIG. 2 depicts a conventional process 200 for adjusting a build platform for this second type of conventional build platform systems.

As shown in frame 202, to place the build platform in a level state, a user manipulates a spacer 204 (e.g., a piece of notebook paper) to subjectively determine a gap height between the extruder head 206 and the build platform 208 at different locations on the printing platform. Typically, the different locations on the printing platform coincide with the locations directly above the posts 210, 212, 214 supporting the build platform. For example, frame 216 shows an adjustment associated with a front left post 214, frame 218 shows an adjustment associated with a front right post 212, and frame 220 shows and adjustment associated with a rear post 210.

After the user visually notes the presence of the gap (or the absence thereof) between the platform and the extruder using the spacer at the different sampled locations, the user then proceeds to manually adjust the build platform height by tightening and/or loosening a spring loaded screw associated with the post of the respective location.

In some contexts, the user gauges this subjective determination based on an attempt to slide the spacer between the extruder and the build platform. Based on the attempt, the user might determine, for example, that there is insufficient space to slide the spacer between the two elements, and therefore the post in that particular location should be lowered. To lower the post, the user manually turns a knob associated with the post (or the base of the post itself) counterclockwise until the leveling sheet fits between the two elements. A user might alternatively determine based on the attempt that there is too much space between the two elements (the extruder and the build platform), and therefore the post in that particular location should be raised. To raise the post, the user manually turns the knob associated with the post clockwise until the level sheet fits between the elements with some resistance. The manual tightening and/ or loosening is performed independently for each of the posts. Generally there are at least three posts connected to the build platform.

The 3-D product generated by the second type of conventional build platform systems can, on some occasions, be relatively accurate, but ultimately the degree of accuracy is highly user dependent. An experienced user of the second type of conventional build platform systems is more likely than an occasional or novice user to achieve an accurate 3-D printed object. Therefore, consumer oriented or teaching-focused 3-D printers using the second type of conventional system are unlikely to reliably provide accurate objects. In addition, 3-D printers requiring regular re-initialization due to environmental factors (i.e., frequent usage, high traffic areas and/or vibrations from other machinery) are also unlikely to reliably provide accurate results. Initialization of the build platform according to this second type of system requires a large investment of time and is tedious.

Moreover, users of the second type of conventional build platform systems face an additional challenge that the build cage which encapsulates the build platform has an access door on only one side of the build cage, limiting access to all sides of the build platform, which makes access and manual adjustment of knobs associated with the rear side post particularly challenging.

SUMMARY

The following is a summary of certain embodiments described in detail below. The described aspects are presented merely to provide the reader with a brief summary of these certain embodiments and the description of these aspects is not intended to limit the scope of this disclosure. Indeed, this disclosure may encompass a variety of aspects that may not be explicitly set forth below.

Example embodiments of the present invention reduce the user interaction required to achieve a level state while providing highly accurate build results regardless of a skill level of a user. The embodiments facilitate achieving a true level state so that the bottom of a printed part is generated on a flat surface, in contrast to conventional build platform systems. In addition, example embodiments of the present invention provide a greater degree of access to control all posts of the build platform, and/or allow for the height of all posts of the build platform to be set simultaneously. Example embodiments facilitate ease of access to build platform adjustment mechanisms despite access restrictions imposed by the build cage. According to example embodiments, a build platform provides feedback to the user regarding a level state of the build platform during an initialization process, to facilitate user adjustments that are as objectively precise as possible.

A general premise with respect to the described example embodiments of the present invention is that whether or not a surface of a printing or build platform is level is evaluated relative to a state of the element of the 3-D printer releasing the ink (i.e., a printer head such as an extruder head). For example, if a build platform is not initialized to a level state relative to a state of the extruder head, then the 3-D object on the build platform will likely not be synthesized accurately.

Example embodiments of the present invention relate to an apparatus that includes a friction fit, spring loaded platform capable of simultaneously adjusting at least three posts supporting the build platform. The apparatus further includes, beneath the build platform, an adjustment apparatus used to lower or raise the build platform until the build platform is at a desired height and a level state. The adjustment apparatus is connected to a lower side of the build platform and to the posts that support the build platform. When the build platform is lowered or raised, the adjustment apparatus is used to disengage or release friction forces clamping the build platform to a particular location on the posts. The spring loaded feature of the posts enables the posts to all extend, upon a complete release of the friction clamping forces, to a maximum height. When the build platform is at an appropriate height and level state, the adjustment apparatus is used to reengage the friction forces clamping the build platform to the posts.

According to an example embodiment, the friction fit spring loaded platform is a build platform for a 3-D printer and includes a platform surface, at least three posts, and an adjustment apparatus. The platform surface includes a planar top side and a planar bottom side. The at least three posts are connected to the planar bottom side of the platform surface, and the respective heights of the at least three posts are adjustable in a direction away from and towards the planar bottom side of the platform surface. The adjustment apparatus connects the at least three posts and is further configured to extend or compress the adjustable height of each of the at least three posts such that the planar top side of the platform surface is at a level state relative to the printer head.

Example embodiments of the present invention relate to a method of using the above-described apparatus.

Example embodiments of the present invention relate to a sensor-based leveling system configured for initialization of a 3-D printer. The sensor-based leveling system includes a housing, that encloses or is included in a movable printer head, and that includes a probe, a sensor, and a processing device by which to calibrate different posts associated with respective portions of the build platform to achieve an overall level state.

Example embodiments of the present invention relate to a method of using the above-described sensor-based leveling system. For example, according to an example embodiment, a method to adjust a build platform of a 3-D printer to a level state includes lowering the build platform; deploying a probe and a sensor communicatively coupled to a processing device; adjusting the probe to a location in a build cage of the 3-D printer above a portion of the build platform and incrementally raising the build platform at the location while measuring, by the sensor, a characteristic of the probe; the processing device comparing the measured characteristic of the probe to a predetermined characteristic; and separately setting the level state for each of the at least three posts based on the comparison of the characteristic of the probe to the predetermined characteristic, in order to achieve the overall level state.

Example embodiments of the present invention relate to a two-point leveling system to adjust a level state of the build platform during an initialization. Using a ball and socket arrangement, in which a ball end of a fixed length post is inserted into a socket pivot point on the bottom side of the build platform, a plane is designated in which a level state can be achieved by adjustments of at least two other posts attached to the build platform.

With regard to the two-point leveling system, example embodiments of the present invention provide a system for adjusting a level state of a platform of a 3-D printer, the leveling system including a build cage surrounding the 3-D printer; a platform including a planar top side and a planar bottom side including at least one socket; and at least three posts that each provides support for the platform at a respective height off of a floor of the build cage. One of the at least three posts is a fixed length post that the at least one socket is configured to receive and that includes, at a first end of the fixed length post, a ball pivot joint configured to engage with the at least one socket.

Example embodiment of the present invention are directed to a method of using the above-described two-point leveling system.

Example embodiments of the present invention relate to a feedback-based apparatus that facilitates manual or automatic adjustment of posts supporting a build platform based on derived feedback. For example, in an example embodiment, the apparatus provides the user of the 3-D printer with sensory feedback that indicates whether the platform is currently too high, too low, or level, or with feedback indicating a motion by which the user can achieve an overall level state.

Example embodiments of the present invention are directed to a method of using the feedback-based apparatus, the method including manually adjusting a build platform of a 3-D printer to a level state, the method including calibrating in turn each of at least three posts supporting the build platform in a build cage of the 3-D printer to achieve the overall level state. During the calibrating, the apparatus provides feedback indicating an instruction to a user to assist in the calibrating and/or a progress report to the user regarding the overall level state.

Although various aspects of the example embodiments of the present invention may be described independently, combinations of the example embodiments are understood to be referred to herein. As such, any combination of features relating to at least the friction fit spring loaded platform, the sensor leveling system, the two-point leveling system, and the feedback system described within the present invention are stipulated to herein. In addition, and conversely, it should be understood that although a feature may be described in the context of a combination with other features, the different features are separable and do not necessarily require or rely on one another for a functional or useful embodiment of the present invention.

The aspects described in the foregoing are presented merely to provide a brief summary of these example embodiments, and these aspects are not intended to limit the scope of this disclosure. Indeed, the present invention may also encompass a variety of other aspects. These and other features, aspects, and advantages of the present invention are further clarified by the following detailed description of certain exemplary embodiments in view of the accompanying drawings throughout which like characters represent like parts.

BRIEF DESCRIPTION OF THE DRAWINGS

FIG. 14 is an example feedback timeline state diagram, illustrating feedback options regarding a leveling state of the build platform according to an example embodiment of the present invention.

DETAILED DESCRIPTION

Example embodiments of the present invention are described below. In an effort to provide a concise description of these embodiments, not all features of an actual implementation are described in the specification. It should be appreciated that in the development of any such actual implementation, as in any engineering or design project, numerous implementation-specific decisions are often made to achieve the developers' specific goals, such as compliance with system-related and business-related constraints, which may vary from one implementation to another. Moreover, it should be appreciated that such development effort might be complex and time consuming, but would nevertheless be a routine undertaking of design, fabrication, and manufacture for those of ordinary skill having the benefit of this disclosure.

Example embodiments of the present invention relate to leveling, or reaching a level state, on a top surface of a build platform of a 3-D printer relative to a printer head, such as an extruder head. The extruder moves in a plane parallel to and in a plane perpendicular to the top surface of the build platform, and accordingly, a relative leveling of the 3-D printer build platform to the extruder head should be considered a focus of the following embodiments as opposed to an absolute level state relative to the base of the build cage. The leveling of the build platform at different locations includes adjusting the support mechanism beneath the different locations on the build platform, as opposed to an adjustment directly to the actual surface of the build platform.

Figure 1:
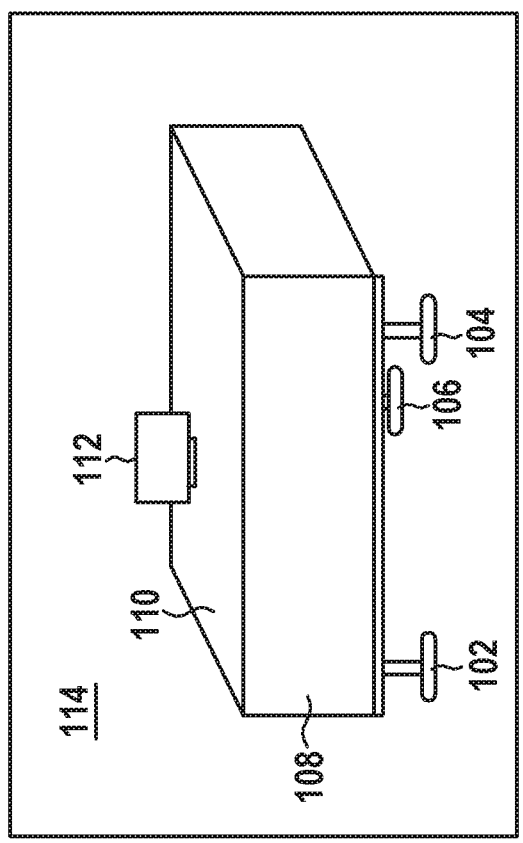
FIG. 1 is a perspective view of a conventional 3-D printer system that includes an adjustable build platform.
Figure 2:
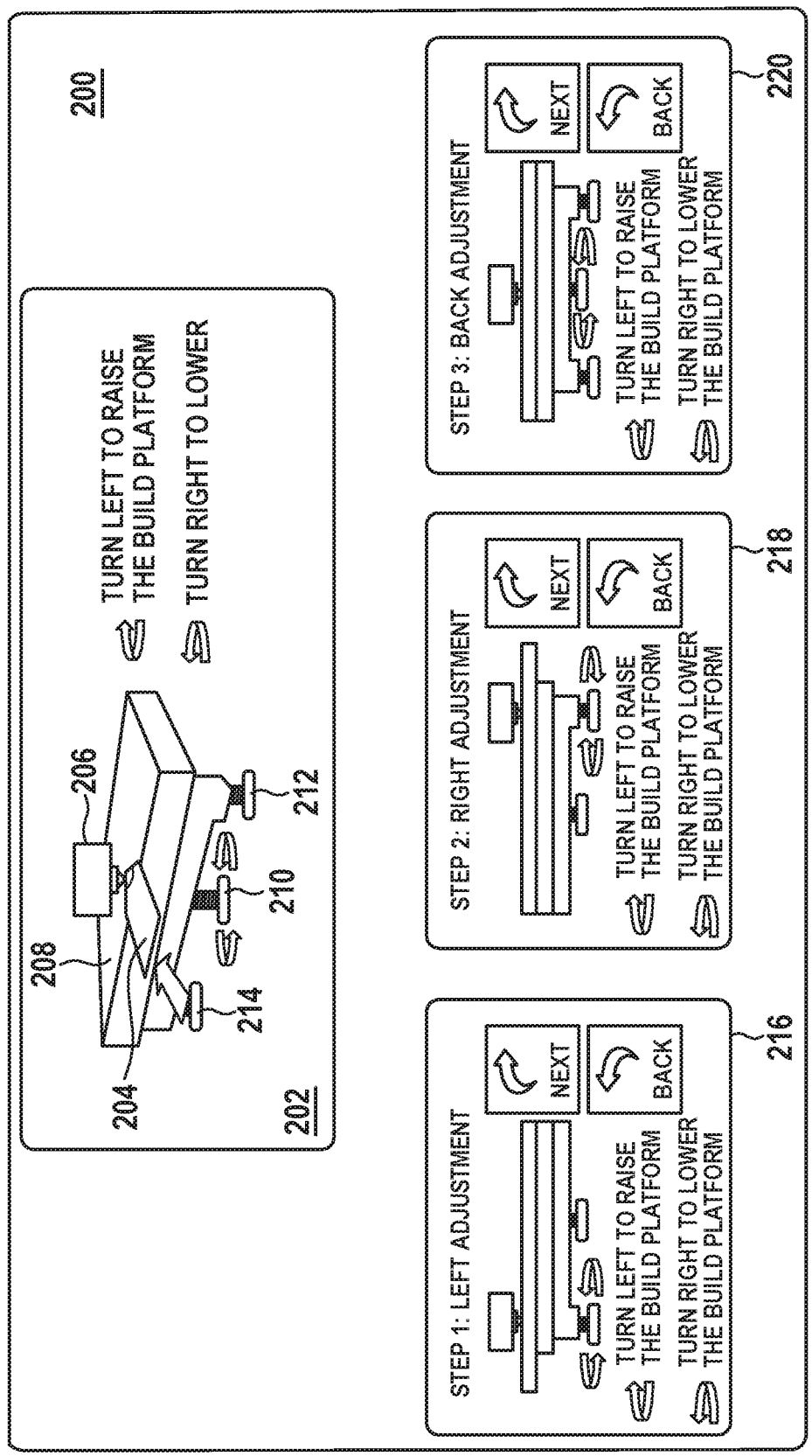
FIG. 2 illustrates a conventional process for adjusting a conventional adjustable build platform.
Figure 3:
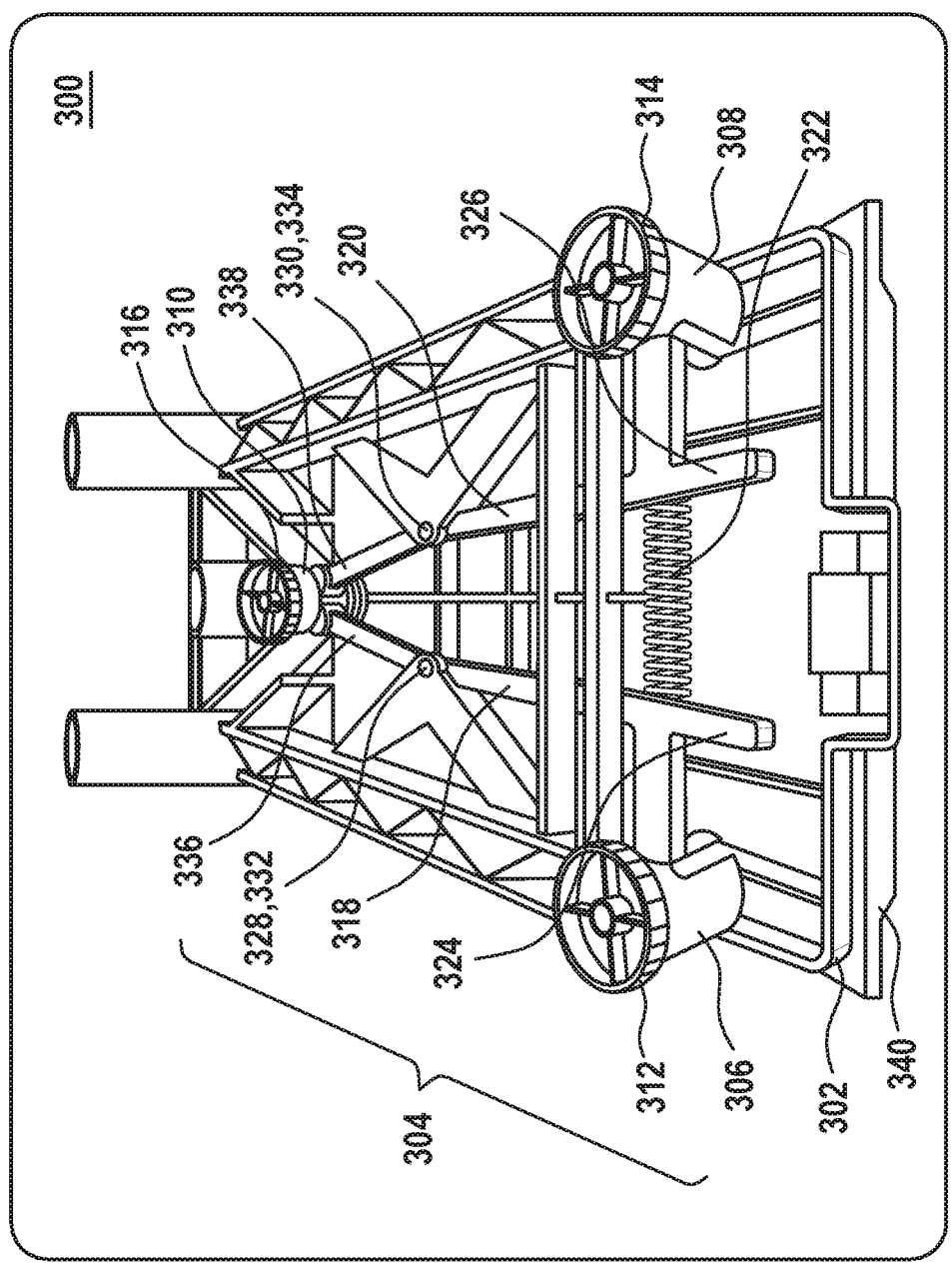
FIG. 3 is a bottom view of a friction loaded spring build platform while it is in a first state, according to an example embodiment of the present invention.

FIG. 3 is a bottom view of a friction loaded spring build platform system 300 according to an example embodiment of the present invention. Friction loaded spring build platform system 300 includes a build platform 302, an adjustment apparatus 304, and three posts. The three posts include two front posts 306 and 308 as well as rear post 310, where front and rear refer to the post placement relative to the access door. In alternative example embodiments, additional posts or different configurations of posts, e.g., an additional rear post, can be provided. For example, in an example embodiment, the adjustment apparatus 304 can include one front post and two rear posts. In the example embodiment having one front post and two rear posts, the adjustment apparatus 304 is automatically actuated by a mechanism in the 3-D printer. Adjustment apparatus 304 connects the build platform 302 to the three posts 306, 308, and 310. Each of the three posts 306, 308, and 310 includes a respective base, labeled as 312, 314, and 316. Heights of the posts 306, 308, and 310 are each adjustable to increase or decrease the distance between the build platform 302 relative to the bases 312, 314, and 316 of the posts 306, 308, and 310.

Specifically, in an example embodiment, the adjustment apparatus 304 is configured to be usable for leveling the build platform 302 by adjustment of the heights of a surface 340 relative to an extruder or other synthesizing head. For example, the adjustment apparatus 304 includes a first arm 318 and a second arm 320. The first arm 318 engages with front post 306 and rear post 310. The second arm 320 engages with front post 308 and rear post 310. The adjustment apparatus further includes friction elements (not shown in FIG. 3) and a spring element 322. Spring element 322 is between, and engages with, the first arm 318 and the second arm 320. The friction elements are positioned to exert friction forces in locations where the arms 318 and 320 engage with posts 306, 308, and 310. For example, in an example embodiment, a friction pad is positioned between first arm 318 and front post 306. In some embodiments, the friction elements are coupled to the respective arms 318/320 and, in other embodiments, the friction elements are coupled to the respective posts 306, 308, and 310. In an example embodiment, the friction elements include or are fabricated from rubber and/or foam.

In the illustrated example embodiment, protruding from the first arm 318, at a first end of the arm 318 in an area proximate to the spring element 322, is a first lever handle 324, and protruding from the second arm 320, at a second end of the arm 320 in an area proximate to the spring element 322, is a second lever handle 326. The lever handles 324 and 326 can be pinched together to compress the spring element 322, which directly releases friction forces exerted by the friction pads on the front posts 306 and 308. When the lever handles 324 and 326 are released, allowing for the spring element 322 to revert to a state of maximum extension, the friction forces from the friction pads are reapplied to the front posts 306 and 308.

In an example embodiment, engagement or disengagement of the spring element 322 using lever handles 324 and 326 further indirectly alters the forces exerted on rear post 310 as follows. Pins 328 and 330 are provided, respectively, at a first pivot point 332 on first arm 318 and at a second pivot point 334 on second arm 320. The pins 328 and 330 are press fit, or machined in, to engage with the first arm 318 and the second arm 320.

When lever handle 324 of first arm 318 is pinched inwards, i.e., away from post 306 and towards lever handle 326, first arm 318 rotates about pin 328 at the first pivot point 332, causing a rear section 336 of the first arm 318 to shift away from post 310. Similarly, when lever handle 326 of second arm 320 is pinched inwards, i.e., away from post 308 and towards lever handle 324, second arm 320 rotates about pin 330 at the second pivot point, causing a rear section 338 of the second arm 320 to shift away from post 310. The shifting of rear sections 336 and 338 away from post 310 releases respective friction elements from engagement with the rear post 310.

Figure 4:
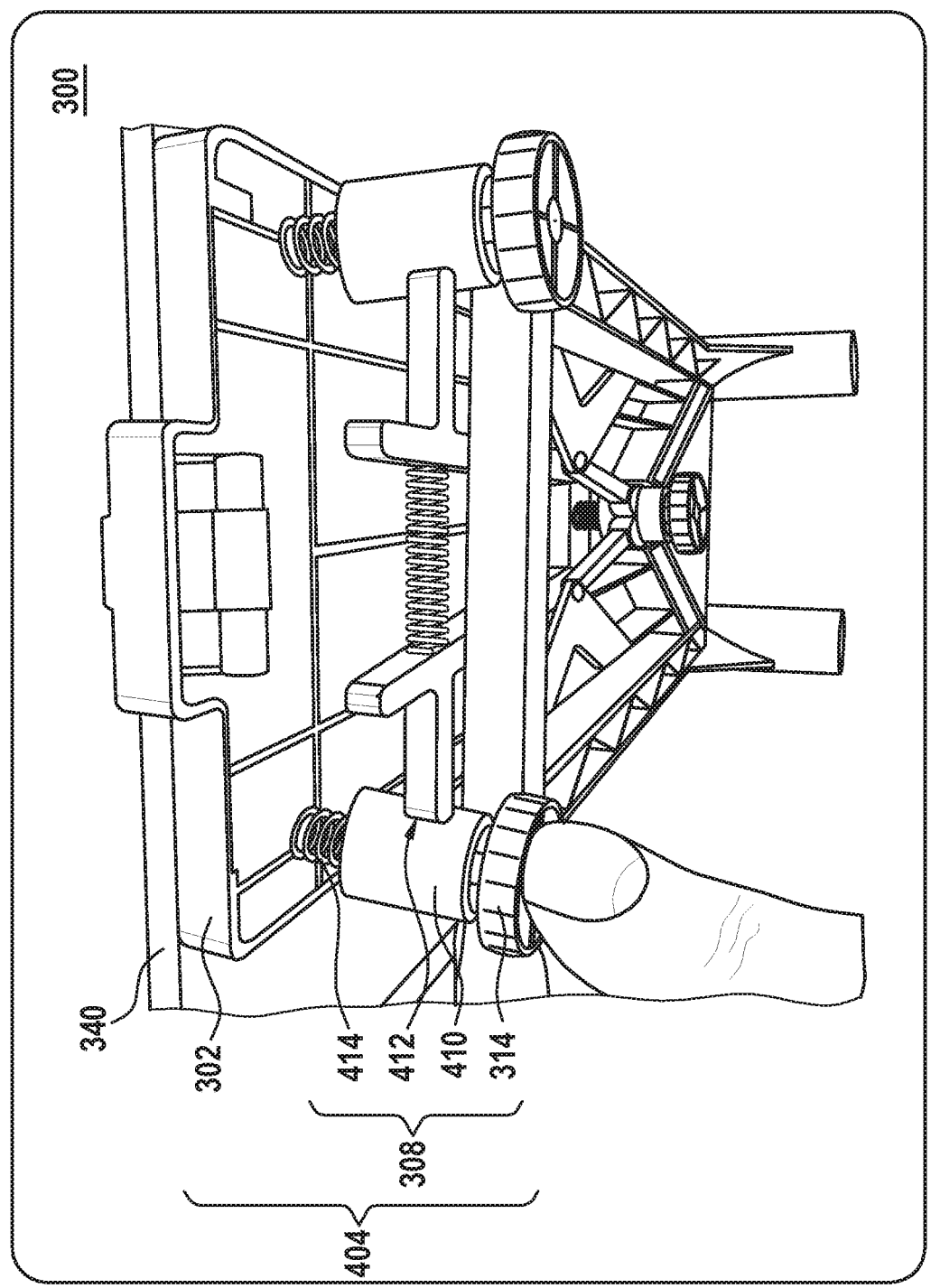
FIG. 4 is a side view of the friction loaded spring build platform of FIG. 3, according to an example embodiment of the present invention.

FIG. 4 is a side view of the friction loaded spring build platform 300 of FIG. 3, according to an example embodiment of the present invention. Features described and labeled in FIG. 4 with respect to post 308 (elements 410, 412, and 414) are similarly provided for post 306. The post base 314 is the portion of the post 308 that rests against a bottom surface of the build cage in the 3-D printer.

In an example embodiment, post 308 includes a post body 410. A spring 414 extends between an underside of the build platform 302 and a top of the post body 410. The spring 302 biases the platform in a direction away from the post body 410, by which a height of the build platform 302 would be raised. However, the device includes components for opposing the force exerted by the spring 414. For example, in an example embodiment, the post 308 includes a clamping region 412 on which the second arm 320 exerts a clamping force, holding post 308 in place against the force applied by the spring 414. For example, in an example embodiment, the post is knurled, threaded, or otherwise textured to increase a friction coefficient to allow a compression pad to better grip the post 308. Alternatively, the post 308 can include a pad on which a knurled, threaded, or otherwise textured part of the second arm 320 can exert the clamping force. The force exerted by the second arm 320 onto the post 308 locks the post 308 in place against the force of the spring 414.

In an example embodiment, when the clamping force is released from the clamping region 412 of the post 308, the spring 414 expands to its maximum extension. Accordingly, each of the spring-loaded posts 306/308 is configured to expand to its maximum height when the clamping forces are disengaged from the posts 306/308.

Figure 5:
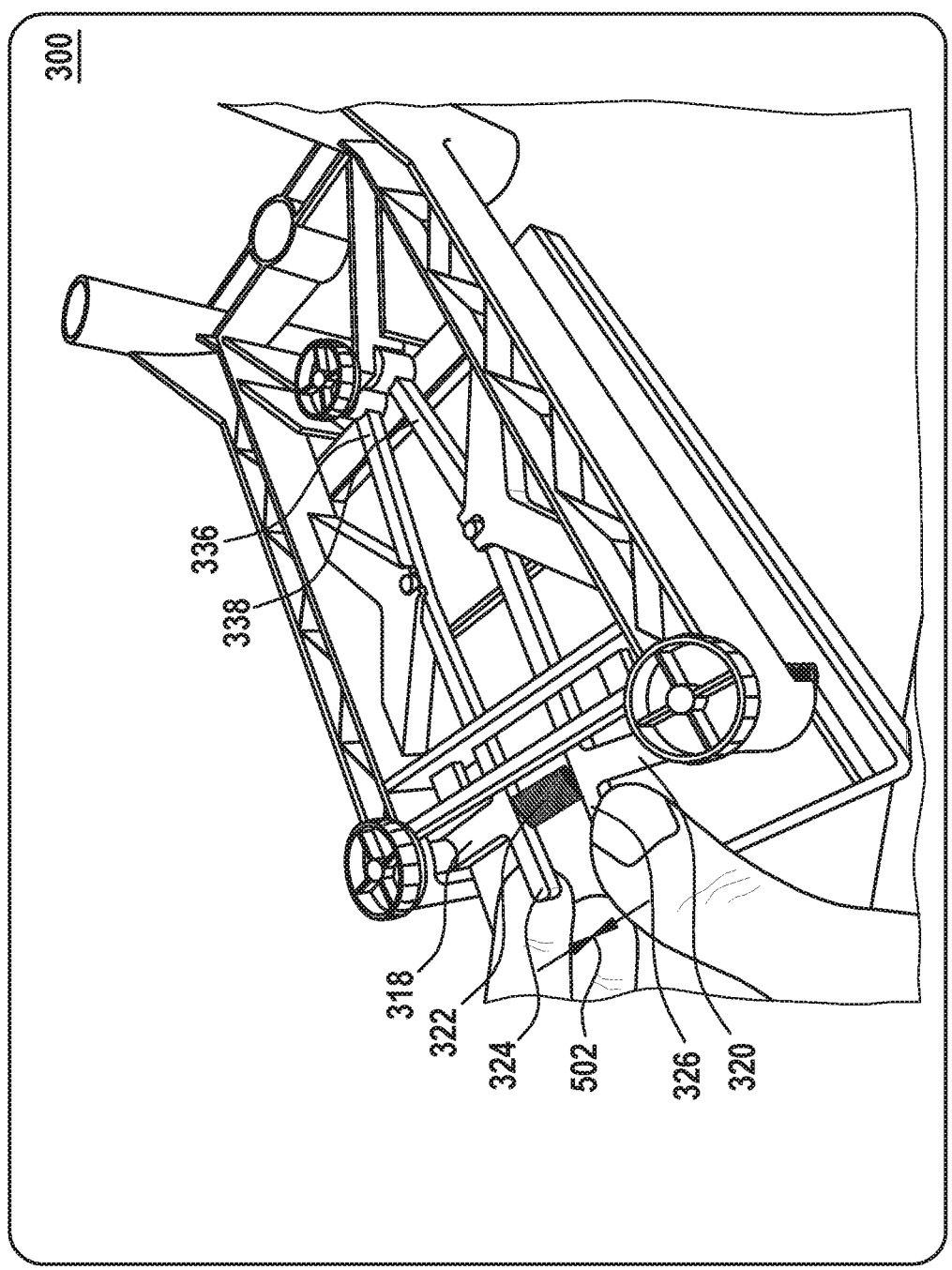
FIG. 5 is a bottom view of the friction loaded spring build platform of FIG. 3, but while it is in a second state under influence of user manipulation, according to an example embodiment of the present invention.

FIG. 5 is a bottom view of the friction loaded spring build platform 300 according to an example embodiment of the present invention, showing compression 502 of the spring 322 under the influence of user manipulation of lever handles 324 and 326, squeezing them towards each other. When the spring 322 is compressed, the friction force of the first arm 318 on the post 306 and the friction force of the second arm 320 on the post 308 are released, in response to which the springs 414 cause the posts 306 and 308 to be shifted away from the build platform 302. Simultaneously to the disengagement of the friction applied by arms 318 and 320 on posts 306 and 308, a friction force that had been similarly applied by rear sections 36 and 338 of arms 318 and 320 on the rear post 310 is also released. In particular, the disengagement of the friction elements from the rear post 310 results from the rear sections 336 and 338 of each of the first arm 318 and the second arm 320 being pulled away from the rear post 310 in directions opposite to the directions of compression 502.

Figure 6:
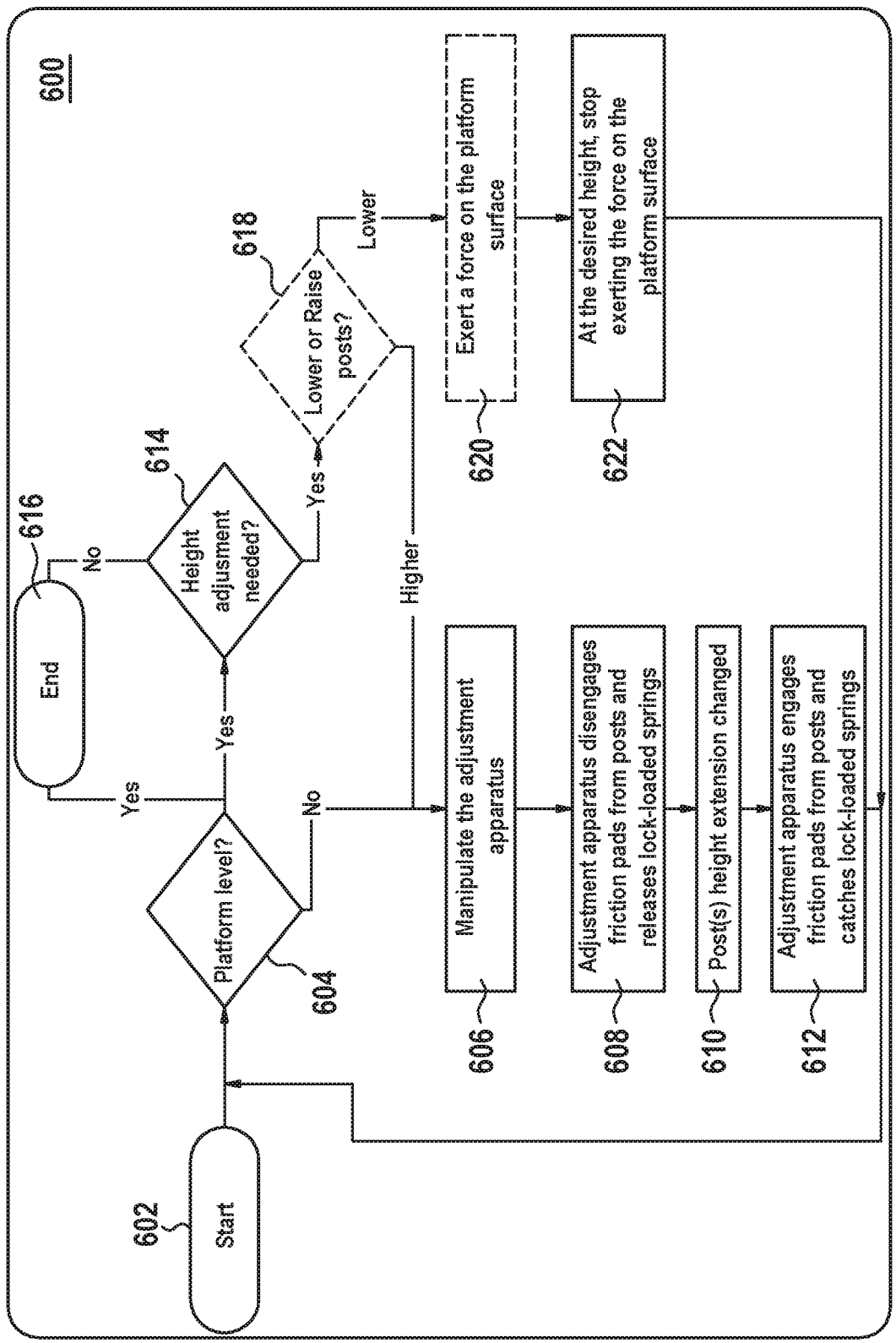
FIG. 6 is a flowchart that illustrates a method for adjusting the friction loaded spring build platform, according to an example embodiment of the present invention.

FIG. 6 is flowchart that illustrates a process 600 for adjusting the friction loaded spring build platform according to an example embodiment of the present invention. The process 600 begins at 602, for example, in response to a trigger such as a printer system start-up, a cue initiated by a user of the 3-D printer system, a new job being requested of the 3-D printer, or a particularly classified type of new job, e.g., a new job classified as requiring a high degree of accuracy, being requested of the 3-D printer.

At 604, the method determines whether the surface of the 3-D printing platform is level. A determination of whether the surface of the 3-D printing platform is level may be executed in accordance with the methods described above or in accordance with other known leveling determinations in the art. For example, in an example embodiment, a linear optical sensor is used in a sensor-based leveling system described above to determine if the platform is level. In other example embodiments, other sensors or methods are implemented to determine whether the platform is level.

If the determination at 604 is that the platform is not level, the process continues with 606. If the determination at 604 is that the platform is level, the process ends at 616. Optionally, instead of ending after the platform is determined to be level at 604, the process continues to 614, which is initiated according to a need determinable by either a processing device within the 3-D printer or a user. For example, in an example embodiment, in a case where the platform is level, the processing device, by accessing information regarding the clearance between the build platform and the extruder head, as well as the digital files specifying the design, can determine that, for the upcoming build, there is insufficient space between the surface of the build platform and the extruder head. The processing device notifies the user of the insufficient space, which prompts 618-622. Alternatively, the processing device initiates 618-622 by actuating an additional mechanical apparatus within the build cage. Alternatively, in an example embodiment in which the platform is level, the user initiates 614 based on a visual cue or a measurement the user takes with a mechanical implement, such as a ruler, and based on a known height of the design, determines that there is insufficient space for the upcoming build between the surface of the build platform and the extruder head.

If the determination at 604 is that the platform is not level, then, at 606 the adjustment apparatus is manipulated. In an example embodiment, the printer system outputs an alert indicating that the platform is not level, thereby prompting performance of step 606. In other embodiments, a user manually performed step 604 to manually determine that the platform is not level, and therefore decides to perform steps 606-612. In an example embodiment, steps 606-612 are performed manually. In an alternative example embodiment, a determination at 604 that the platform is not level results in a mechanical trigger that that triggers automatic performance of steps 606-612.

In an example embodiment, at step 606 the adjustment apparatus is manipulated. In an example embodiment, the manipulation involves squeezing lever handles of the adjustment apparatus, e.g., as shown in FIG. 5.

Due to the manipulation of the adjustment apparatus at 606, at 608, a spring of the adjustment apparatus is compressed and friction pads are disengaged from posts supporting the build platform (or from arms of the adjustment apparatus in an embodiment in which the friction pads are coupled to the posts) and vertical lock-loaded springs of each post are released and, at 610, the posts extend based on the extent to which the vertical lock-loaded springs are expanded before the friction pads are re-engaged. In an alternative example embodiment, the friction pads are disengaged and the vertical lock-loaded springs immediately expand to a maximum extension. At the maximum extension of the lock-loaded springs, each of the posts are at a maximum length.

After 610, in which the heights of the post extensions have been changed to level the platform, the friction pads are re-engaged at 612. In an example embodiment, the re-engagement of the friction pads by the adjustment apparatus occurs when the lever handles are released, discontinuing the squeezing motion. For example, in the example embodiment in which 606 involves a user squeezing the lever handles, 612 occurs when the user releases the lever handles. On the other hand, in the example embodiment in which 606 involves a machine performing the compression of the spring arranged between the arms of the adjustment apparatus, the machine's discontinuance of that squeezing motion occurs at 612. When the squeezing motion is discontinued, the friction pads reengage at each of the support posts, thereby holding the lock-loaded springs within the posts in place.

The build platform 302 can then be lowered again to a desired position, for example, by manually applying pressure to a top of the build platform 302, for example, to apply a downward force greater than that of the springs 414 and sufficient to overcome the frictional force applied by arms 318 and 320 on the posts 306, 308, and 310. Once the additional pressure is removed, the frictional force holds the posts in place.

In some example embodiments, when the lock-loaded springs are all held in place at maximum extension, the build platform is level and is able to support the weight of a typical printed 3-D object without the weight of the printed 3-D object causing a change to the height of the posts. Although the build level may be level relating to the posts, it is not necessarily level relative to the extruder, and further adjustment may therefore be needed. When further adjustment is needed, the fine-tuning of the posts to achieve a level build platform is executed in accordance with other methods described herein. To ensure that the platform is level at the post levels set at step 610 in the immediately preceding iteration of performance of steps 606-612, the process 600 returns to 604.

According to an example embodiment, step 614 is executed simultaneously with step 604. In an alternative example embodiment, step 614 is performed prior to step 604. In yet another example embodiment, and as shown in FIG. 6, step 614 is performed subsequent to step 604. If it is determined at 614 that a height adjustment is necessary, 618 is executed. If it is determined that the height adjustment is not necessary, the process ends at 616 (according to the embodiment in which 614 is performed after the platform had been determined at 604 to be level). At 618, it is determined whether the posts of the locked spring-loaded platform should be adjusted to a lower or a higher level than their current degree of extension. If the posts need to be at a higher level, steps 606-612 are executed. If the posts need to be at a lower length, 620-622 are executed. At 620, without manipulating the adjustment apparatus, a force greater than that which would be exerted under the weight of a typical printed 3-D object is exerted downwards onto the surface of the build platform, for example by a mechanical component or by a human. The pressure on the build platform causes the lock-loaded springs to compress against the friction forces exerted by the friction pads on the posts, thereby gradually shortening the posts and pushing the platform downwards. Based on the compression of the lock-loaded springs, the platform is pushed downwards at one or more locations of the platform for independently adjusting the heights of the different posts. For example, if it is determined that the platform needs to be lowered in the region of post 308, the pressure is exerted, e.g., on top of the platform opposite the position f post 308, thereby compressing the spring 414 of post 308, without affecting the height of the other posts. At 622, once the desired height is reached, the downward force is released and the friction elements hold the post at the new height position against the force of the lock-loaded springs.

Figure 7:
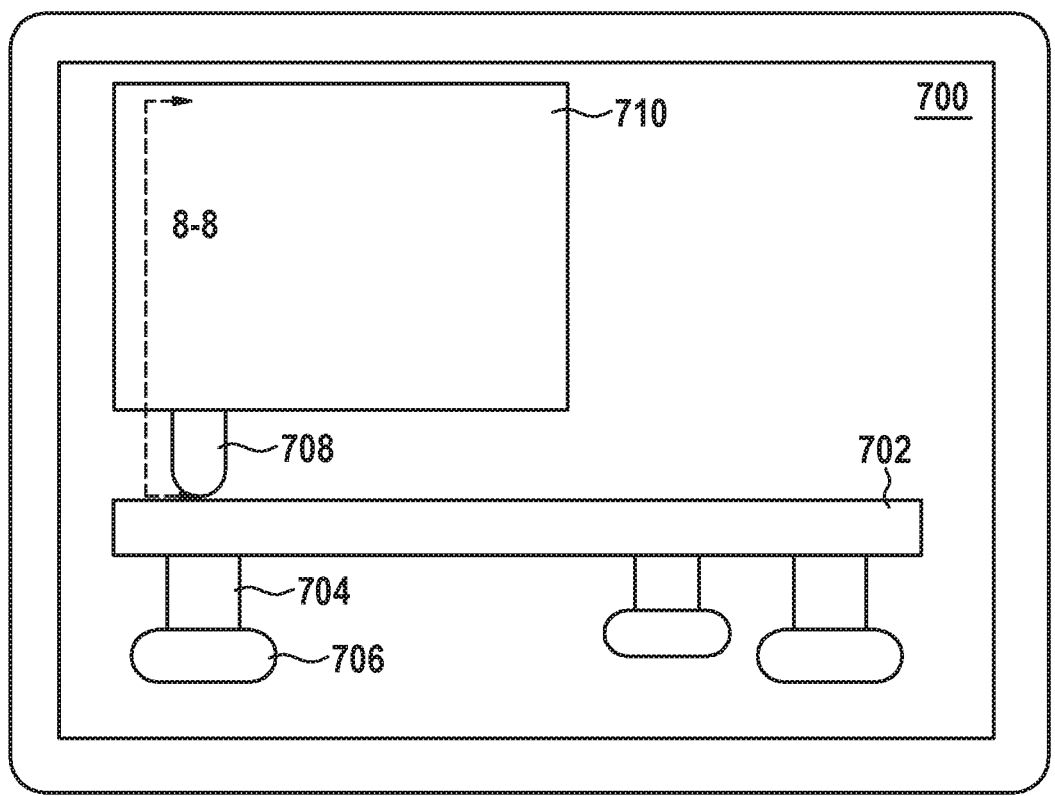
FIG. 7 is a diagram that illustrates a front view of a sensor leveling system in a build cage, the system including a sensor configured to adjust a build platform during an initialization process, according to an example embodiment of the present invention.

FIG. 7 is a front view of a sensor-based leveling system in a build cage 700, the system being configured to adjust a build platform 702 in the build cage 700 to a level state during an initialization process according to an example embodiment of the present invention. The sensor leveling system includes a probe 708 that extends from inside of a probe housing 710. In an example embodiment, the probe housing 710 is part of an ink dispensing element of the 3-D printer, such as an extruder head. The probe housing 710 is movable relative to an upper surface of the build platform 702. The build platform 702 is supported by a set of posts, e.g., three posts as shown in FIG. 7 (one of which is labeled as post 704 and the description of which applies to the other posts). In an alternative example embodiment, more than three posts support the build platform 702. Post 704 further includes a base 706 that supports the post 704 against a base of the build cage 700.

When the sensor-based leveling system is sensing a feature related to the probe 708, the probe 708 is centered over one of the posts. For example, in build cage 700, the probe 708 is depicted as being centered over post 704. During the sensing process, the probe housing 710, and thus the probe 708, which is coupled to the probe housing 710, are lowered towards the build platform 702. After the bottom of the probe 708 reaches the surface of the build platform 702, the probe 708 is subsequently subject to an upward force exerted by the build platform 702 with continued downward motion of the probe housing 710. In an example embodiment, the probe 708 is pushed upward into the probe housing 710 in response to the upward force. In an example embodiment, a processing device connected to the probe 708 determines and records the height of the extruder head relative to the inside of the build cage when the probe strikes the build platform 702. In an alternative example embodiment, the processing device determines and records the extent to which the probe is displaced in the housing 710 and the directionality of the displacement within the housing. To determine the height of the extruder head when the probe strikes the build platform, the extent to which the probe is pushed into the housing, or the directionality of the displacement of the probe in the housing, the processing device receives data from sensors on the probe or in the probe housing.

In the example embodiment in which the processing device is connected to the probe 708 and determines and records the height of the extruder head when the probe strikes a platform, a first post is used to calibrate the height. The build platform 702 is lowered at the first post 704. The probe 708 is centered over the post 704 by moving the probe housing 710. In some example embodiments, the post is raised so that the height of the first post 704 moves the build platform 702 to a desired height before the probe housing is lowered. The probe housing is lowered onto the build platform 702 over the post 704. When the sensor in the probe housing 710 and the processing device detect the strike between the probe and the build platform, the height of the probe housing 710 is measured and recorded as a calibration height. The probe 708 is then centered over one of the remaining posts by moving the probe housing 710. The probe housing 710 is moved to the calibration height, and then the build platform 702 is raised at the respective remaining post until a strike is detected. The process is repeated for each remaining post.

In an example embodiment, this is repeated at each of the posts in order for the processing device to identify a tilt of the build platform 702, in response to which leveling should be performed.

In an alternative example embodiment, the system senses an offset between the probe 708 and the probe housing 710 under influence of the contact between the probe 708 and the build platform 702 and uses that information to determine to a high degree of specificity the tilt of the build platform 702. In the example embodiment in which the processing device is connected to the probe 708 and determines displacement in the housing and the directionality of the displacement within the housing, the sensor based leveling system measures a relative offset between a fixed reference position and the position of the probe 708, after the probe has been pushed upwards or released downwards. In an example embodiment, a sensor is provided, for example, attached to the probe 708 in the probe housing 710. Depending upon the specific sensor installed, a variety of configurations of the sensor-based leveling system are possible and stipulated to herein. In an example embodiment, the sensor is a linear optical sensor, a fixed reference pattern with predetermined reflective characteristics is placed on the probe, and when the probe is pressed into the housing, the linear optical sensor is exposed to a particular portion of the fixed reference pattern, thereby indicating that, an amount by which, the probe 708 has been pressed upwards into the housing 710.

Similarly, other sensors can be deployed, including at least any of: Hall effect sensors, rotary encoders, linear encoders, micro-switches, a pressure sensor, and a capacitor. For each of the other sensors deployed, different reference patterns, particular to the type of sensor, would be provided in the probe housing 710 or on the probe 708 to trigger a varying effect on the sensor based on the relative probe placement. For example, a reference pattern for a Hall effect sensor refers to, in some embodiments, a magnet that is placed on the probe or in the probe housing. In some embodiments, a reference pattern for a Hall effect sensor refers to a plastic probe including a metal component that trips the Hall effect sensor. However, the optical sensor system provide advantages over other sensors. For example, Hall effect sensors are digital on/off devices, whereas the optical sensor system is a continuous system that can measure how far off the platform is from a level state, making it easier to refine the leveling of the platform.

In an example embodiment, output from the processing device, which receives the data from the sensor, is used to automatically manipulate the posts and/or height of the build platform. In an alternative example embodiment, output from the processing device, which receives the data from the sensor, is used to provide feedback to the user regarding how the user should manually manipulate the posts and/or height of the build platform. As an example, the output is used to provide feedback to the user regarding whether a post height should be raised or lowered to achieve a level build platform. In an example embodiment, the processing device generates the output or adjusts the height(s) based on a difference between the determined position of the build platform 702 and an expected position of the build platform 702.

Figure 8:
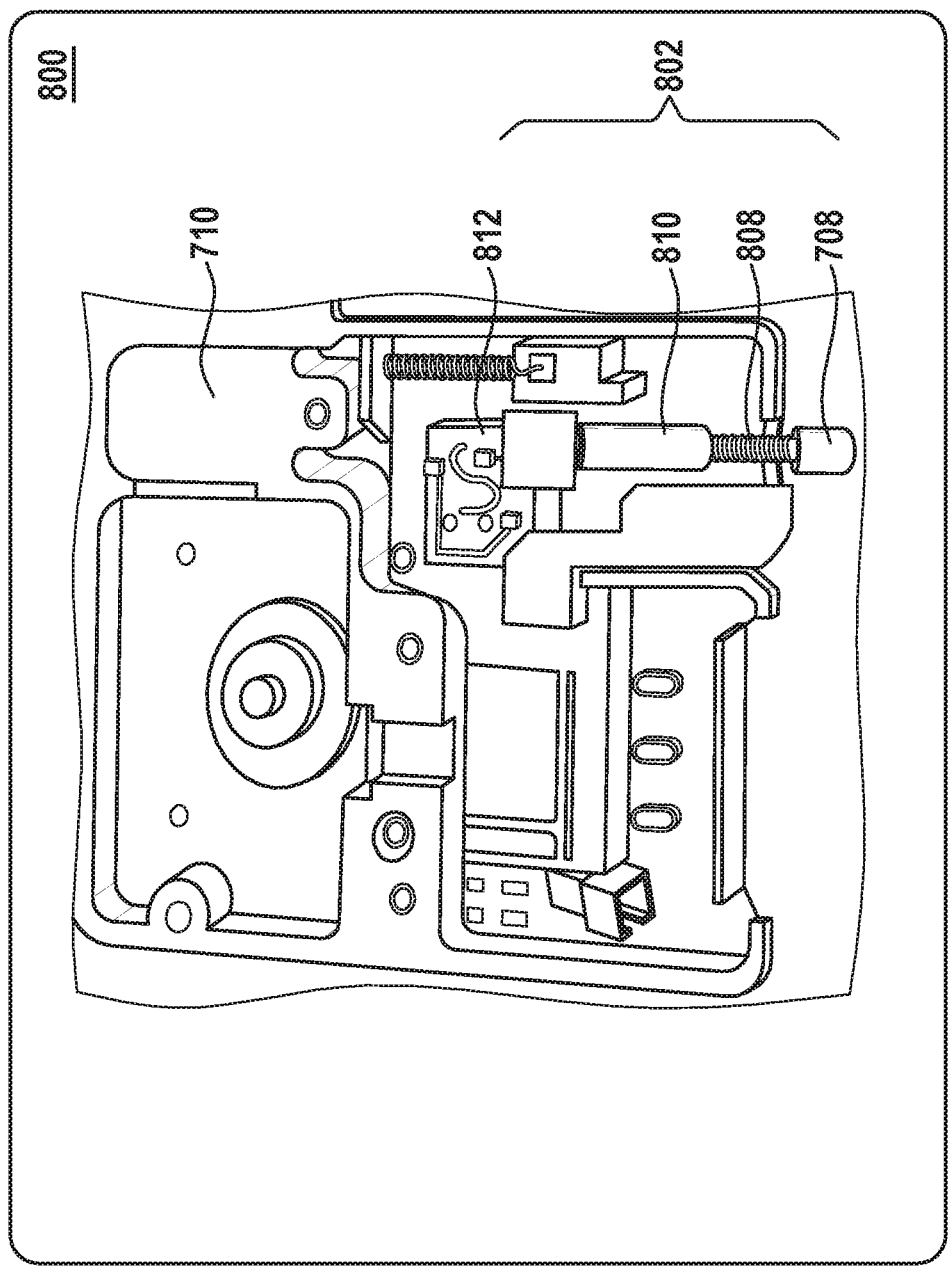
FIG. 8 is a cross sectional view of the sensor and sensor housing taken at line "8-8" of FIG. 7.

FIG. 8 is a cross sectional view 800 taken at line "8-8" of FIG. 7 of a portion of the device shown to the right of line "8-8" in FIG. 7. View 800 shows right portion 804 of the probe housing 710, a chip 812 that includes a sensor (a Hall effect sensor is shown in FIG. 7, but, as noted above, other sensors can be used instead) and a processing device, and probe 708. In an example embodiment, the probe housing 710 also includes the extruder head and other elements needed to generate the printing material. The probe housing 710, and any connected extruder elements, are movable relative to the build platform 702. In an example embodiment, probe 708 includes several components: build platform contact portion 806, elastic portion 808, and probe body 810. In an example embodiment, the probe 708 is metal. In other example embodiments, depending upon the sensor used, the probe can be constructed entirely or partially of a non-metal material.

During use of the sensor system, build platform contact portion 806 protrudes out from the bottom side of the probe housing 710 and in a direction towards the build platform 702. When the portion 806 comes into contact with the build platform 702, the probe portion 806 is pushed upward and telescopically into the probe body 810, which is located in the probe housing 710. In particular, the elastic portion 808 is biased so as to push the contact portion 806 outward away from the probe body 810, but the contact of the contact portion 806 with the build platform 702 exerts a force against the biasing force of the elastic portion 808, thereby causing the contact portion 806 to telescope into a cavity in the probe body 810 and compress the elastic portion 808. In an example embodiment, the elastic portion 808 is a spring surrounding a section of the probe contact portion 806.

In an example embodiment, the probe 708 used during the initialization and/or leveling of the build platform 702 is entirely retractable into the probe housing 710 during a build or printing process to avoid restriction of movement during the printing process.

As noted above, in an example embodiment, the processing device is included within the probe housing 710, e.g., as part of a chip 812. In an alternative example embodiment, the processing device is provided external to the probe housing 710 but a transmitter, communicatively coupled to the processing device, is included in or on the probe housing 710 and receives data from the sensor that measures data regarding the probe 708 and transmits the measured data to the external processing device.

Referring to the example embodiment in which the sensor-based leveling system includes a linear optical sensor, in an example embodiment, when a linear optical encoder is exposed to a portion of a light reflecting fixed reference pattern, the sensor communicates light absorption data to the processing device. The processing device compares the received light absorption data to a set of light absorption data in which absorption percentages are associated with a position of the platform. Based on the comparison, the processing device determines how the build platform should be adjusted to achieve a level state. For example, the processing device determines based on the comparison that the build platform should be adjusted up or down and communicates that determination to a user in the form of feedback. In an example embodiment, the processor determines, from multiple samples of the measured characteristic over time (and associated with different adjustments of the build platform), how the build platform should be adjusted.

Figure 9:
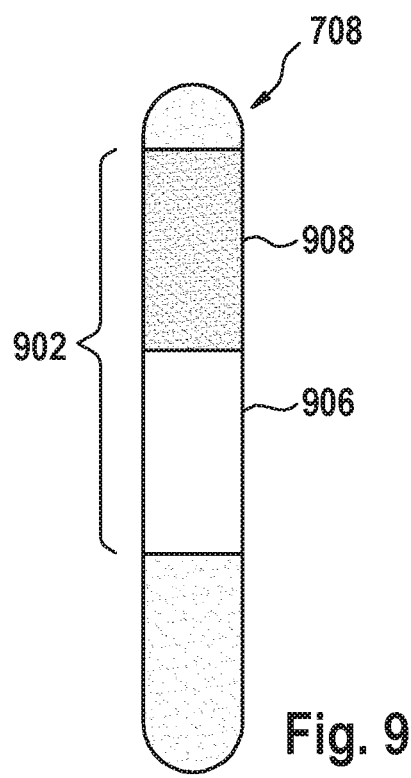
FIG. 9 shows probe including a reference pattern for an optical sensor according to an example embodiment of the present invention.

According to an example embodiment in which a linear optical sensor is used, the probe 708 includes a reference pattern 902, for example, as shown in FIG. 9. As described in the foregoing, in an example embodiment, the reference pattern includes materials having varying degrees of light absorption, e.g., first material 906 and second material 908. The pattern can be of any geometry suitable for system calibration, including, for example, contrasting colors by which to change light reflection. For example, a pattern 902 including white and black portions as shown in FIG. 9 provide extreme contrasting colors, which are particularly suitable for this purpose.

In an example embodiment, an optical sensor is provided, for example, in the housing 710 and is focused at a fixed point in a direction towards the probe 708. Based on the current position of the probe 708 relative to the fixed point at which the sensor is focused, the linear optical sensor detects a varying percentage of light reflected off of the pattern 902. As the probe 708 slides up and/or down, based on its position relative to the position of the build platform 702, the optical sensor measures a different percentage of reflected light based the portion of the reference pattern 902 exposed to the sensor. The linear optical sensor communicates the measurement to the processing device. The processing device translates the output provided from the sensor into feedback, relating to the height and/or level state of the platform 702, specific to the location of the probe housing 710, for the user.

Figure 9A:
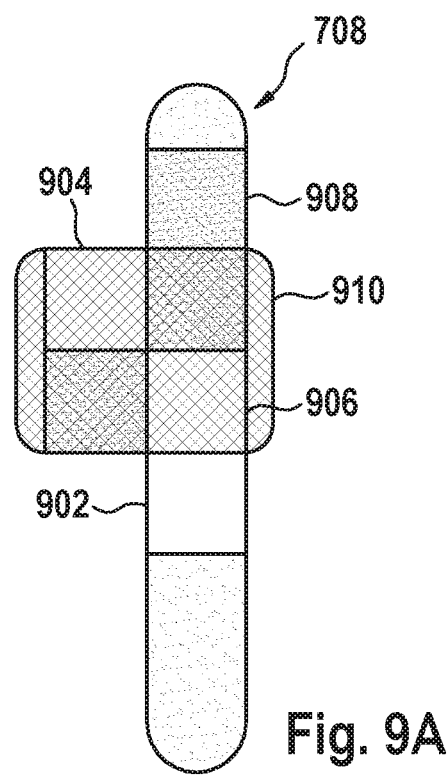
FIGS. 9A-9C show the probe with its pattern at various positions relative to a control reference pattern, according to an example embodiment of the present invention.
Figure 9B:
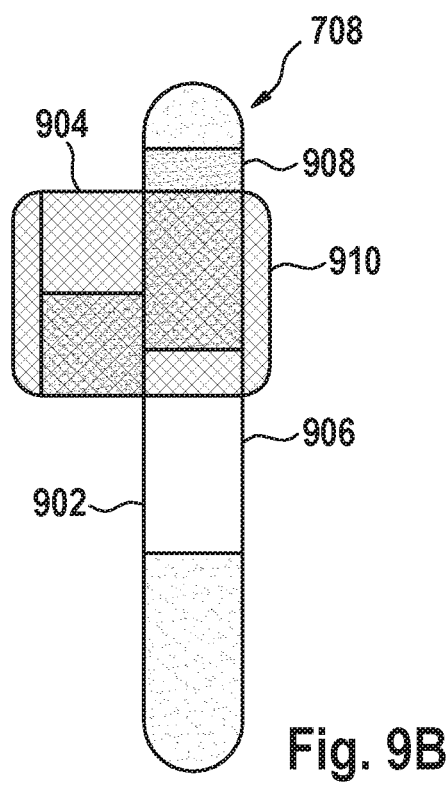
Figure 9C:
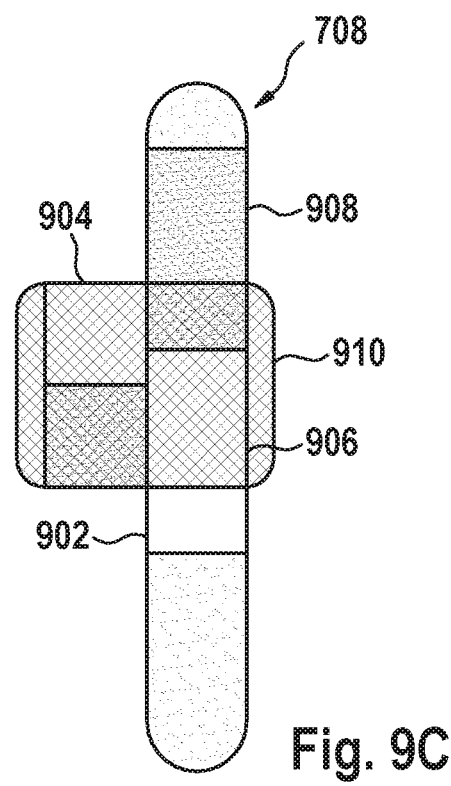

For example, FIG. 9A shows an outline of a sensor's field of view 910 of the pattern 902 when the probe 708 is at a first position in which the pattern 902 reflects light so that the detected light is at about 50% of a maximum, FIG. 9B shows an outline of the sensor's field of view 910 of the pattern 902 when the probe 708 is at a second position in which the pattern 902 reflects light so that the detected light is less than 50% of the maximum, and FIG. 9C shows an outline of the sensor's field of view 910 of the pattern 902 when the probe 708 is at a third position in which the pattern 902 reflects light so that the detected light is greater than 50% of the maximum.

In an example embodiment, aside from the pattern on the probe, the system additionally includes a fixed reference pattern positioned, for example, on the inside of the probe housing 710. For example, FIGS. 9A-9C show a fixed control reference pattern 904, which always stays in the field of view 910 of the sensor, and, in an example embodiment, is a complement to the pattern on the probe 808. Where a fixed control reference pattern 904 is provided, the pattern 902 on the probe 708 moves relative to the fixed pattern 904. This could be used to help calibrate the sensor in the idle (non-measuring) state, allow for measurement relative to a current reading with respect to the fixed pattern 904 rather than with respect to some predefined value that might change, and/or to control the rate of sensor change (light intensity in this example) relative to the movement of the probe 708. (It is noted that other types of sensors provided in alternative example embodiments, e.g., a Hall effect sensor, can also be provided with a reference in example embodiments. For example, the Hall effect sensor measures the intensity of magnetic fields, for which a the magnetic field strength sensed by the sensor in its idle state can be provided as a reference pattern, where the "pattern" (field strength) changes as the probe is pressed in and moves a magnet or ferrous metal closer to the sensor, and the processing device determines the location of the probe based on the output of the sensor, which is directly correlated to the field strength. Depending on the type of sensor used, a corresponding "pattern" that is a function of whatever the sensor measures can be provided, with the sensor's sensor signal corresponding to the pattern in the resting or idle state.)

In an example embodiment, the system guides height adjustment at each of the posts to be at a position at which the probe 708 is positioned relative to the sensor so that the sensor detects light at approximately 50% of the maximum, e.g., as shown in FIG. 9A.

In an example embodiment, the platform 702, at a position of a first one of the posts, is adjusted to the predefined position, e.g., the position at which approximately 50% of the maximum light is detected. The system then records the position of the platform 702, e.g., relative to a base. Subsequently, for each of the other posts, the system first adjusts the posts to bring the platform 702 to the recorded level, and then performs fine-tuned corrections (or provides output guiding a user to manually perform fine-tuned corrections) based on the sensor output, based on whether the sensed light is more than, less than, or approximately equal to 50% of the maximum light. The initial placement at the recorded position of the first post speeds the process. (Alternatively, height adjustment is performed at each post independently, without reference to a recorded height position at any of the other posts.)

In the above-described embodiment, the system guides the adjustment at each of the points to be at a particular predefined position with respect to the probe position relative to the probe housing, e.g., at the position described with respect to FIG. 9A. However, according to an alternative example embodiment, the system provides for a user to first adjust the height of the platform 702 at the location of a first one of posts to a desired location. The system then records the sensor value for the position, e.g., 75% of maximum light, and then subsequently guides the positioning of the platform at each of the other posts to the same sensor position, e.g., the position at which 75% of maximum light is sensed.

Figure 10:
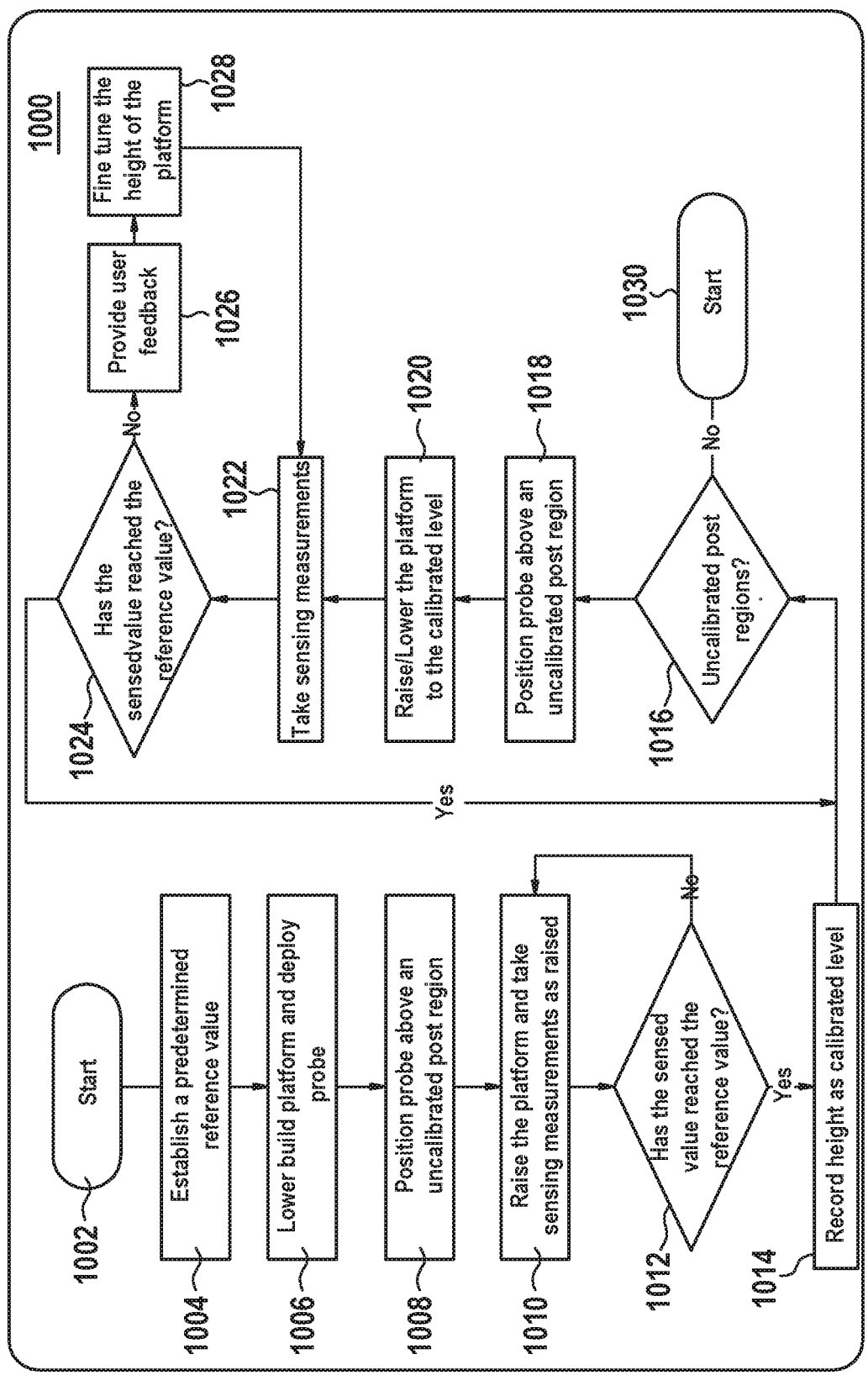
FIG. 10 is a flowchart that illustrates a method for adjusting a build platform using sensors in the build cage.

FIG. 10 is a flowchart that illustrates a process 1000 for adjusting the build platform using the sensors in the build cage, according to an example embodiment of the present invention. At 1002, the process 1000 begins. In some embodiments, the process 1000 begins at 1002 upon a trigger such as a printer system start-up or upon a cue initiated by a user of the 3-D printer system. In some embodiments, the process 1000 begins at 1002 upon a new job requested from the 3-D printer or upon a particularly classified type of new job requested from the 3-D printer. For example, a new job classified as requiring a high degree of accuracy may automatically prompt process 1000 to begin at 1002.

After start, and at 1004, a predetermined reference value is established. The predetermined reference value corresponds to an ideal measurement of the fixed reference pattern that would be obtained by the sensor deployed in the probe housing should the probe be placed in a position associated with a proper level state of the build platform relative to the extruder head. In an example embodiment, a 50% absorption rate of light is the predetermined reference value. In an example embodiment, the predetermined reference value is established based on an extension of a fixed length post of the build platform.

At 1006, the build platform is lowered and the probe is deployed from the probe housing. By deploying the probe, a portion of the probe is adjusted so as to protrude from the base of the probe housing.

At 1008, the probe is positioned above an uncalibrated region of the build platform that is associated with a support post of the build platform. In an example embodiment, to position the probe, the entire probe housing is moved. The selection of which probe should be calibrated first is generally selected by design. In an example embodiment, however, when a two point leveling is implemented as described below, calibration of the height of an isolated ball and socket post (described below) is completed before the calibration of any other of the posts.

At 1010, after the probe is properly deployed and aligned with a particular portion of the build platform above a post region, the build platform is raised. In an example embodiment, the build platform is raised slowly and in small incremental steps. As the build platform is raised, the sensor leveling system measures the relative position of the probe, e.g., in a manner discussed above, for example by a light absorption profile.

At 1012, it is determined whether the measured value has reached the predetermined reference value. In an example embodiment, the measured value from the sensor leveling system is compared to the predetermined reference value. Until the predetermined reference value is reached, the platform continues to raise and measurements are continually taken at 1010.

Once the measured value has reached the predetermined reference value, the process proceeds to 1014. At 1014, the height of the post is recorded as a calibrated level. In some embodiments, the height of the build platform is recorded as a calibrated level, and in some embodiments, both of the heights of the build platform and the posts are recorded. The calibrated level is recorded by storing the data in a memory element associated with the processing device in the probe housing.

At 1016, it is determined whether any additional regions of the build platform associated with posts have not been calibrated. If no further posts require calibration, the process ends at 1030. If further posts do require calibration, the process continues with 1018. At 1018, the probe is repositioned above another region of the build platform that is associated with a support post of the build platform. In an example embodiment, to position the probe, the entire probe housing is moved. The selection of which remaining and uncalibrated probe should be calibrated next is selected by design.

At 1020, once the probe is repositioned, the build platform is raised or lowered to the calibrated level of the first post, for example, to a position at which a height of the post at the respective location is the same as that of the first post, as recorded in step 1014. After the build platform is raised/lowered to the calibrated level, the sensor leveling system measures the position of the probe at 1022. At 1024, it is determined whether, for the post under test, the measured value has reached the predetermined reference value. For example, in an example embodiment, the measured value from the sensor leveling system is compared to the predetermined reference value. If the predetermined reference value has not been reached, optionally, feedback is provided to the user of the device in 1026.

At 1028, based on the failure to adjust to the predetermined reference value, the height of the platform at the particular location of the post under test is fine-tuned. In an example embodiment, the user of the 3-D printer adjusts the height of the post, e.g., based on feedback provided at step 1026. In optional 1026, the 3-D printer provides to the user of the device feedback that assists with the fine-tuning of the post height. In an example embodiment, the feedback is provided on a display of the 3-D printer or through a speaker of the 3-D printer. The information provided in the feedback relates in some embodiments to the directionality of the adjustment and/or the amount of adjustment needed. In another example embodiment, the platform raises or lowers according to automated instructions implemented by the 3-D printer system as necessary. At 1022, measurements are continually taken, and the comparison is continually executed at 1024.

Once the measurement for the post under test establishes that the measured value has reached the predetermined reference value, the process returns to 1016. In an example embodiment, between the determination of 1024 and 1016, particularly if the embodiment involves user adjustment, an alert is provided to the user of the 3-D printer that the predetermined reference value has been reached for the respective post that had been calibrated in the previously completed post adjustment. At 1016, it is checked if any further posts require calibration according to process 1000. If not, the process concludes at 1030.

Figure 11:
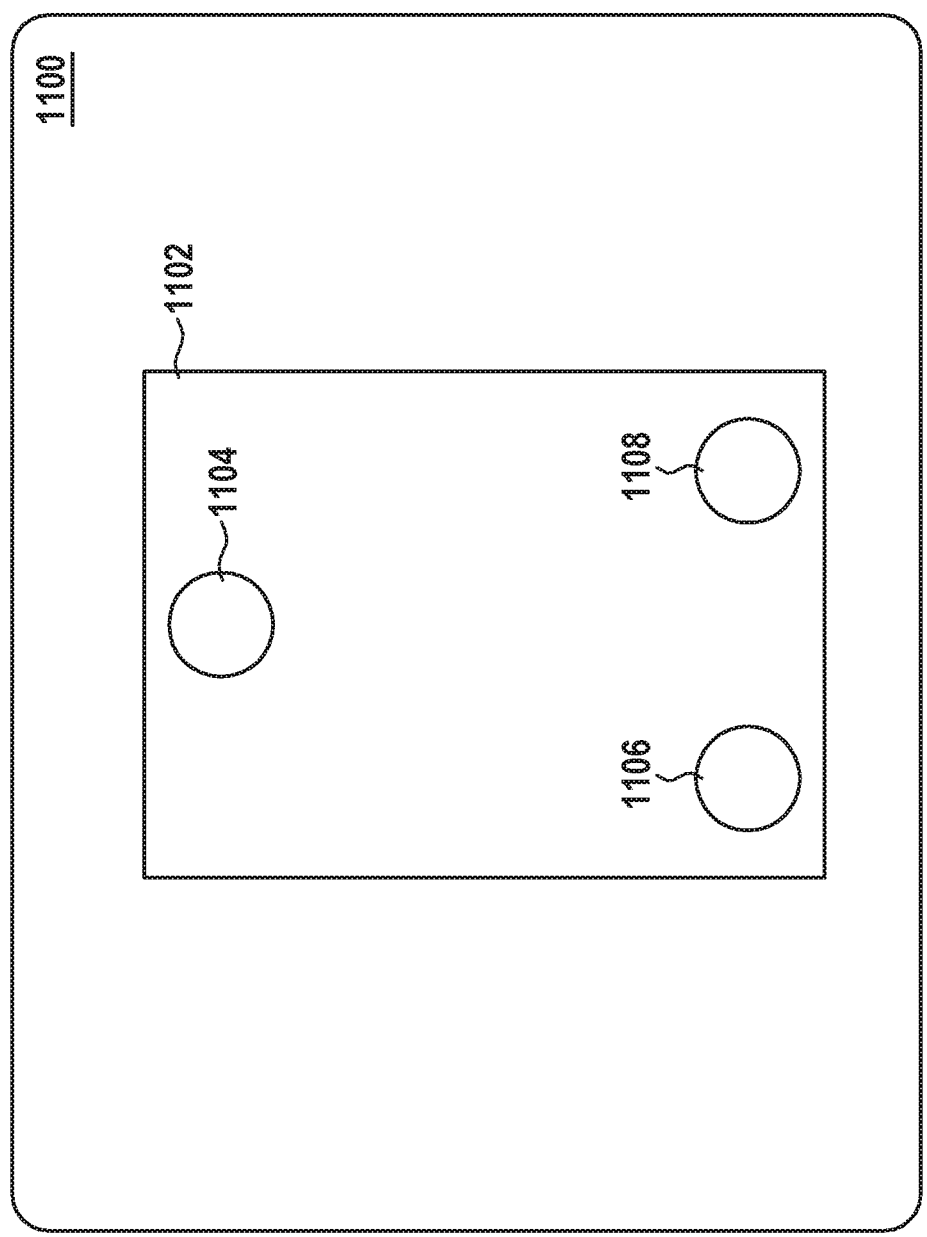
FIG. 11 is a bottom view of a two-point leveling build platform included in a 3-D printing system according to an example embodiment of the present invention.

FIG. 11 is a bottom view of the two-point leveling build platform included in a 3-D printing system 1100 according to an example embodiment of the present invention.

In 3-D printing system 1100, a build platform 1102 provides a configuration enabling two-point leveling. Such a configuration is useful particularly in a restricted build cage in which only the front two posts are easily adjustable. As shown, the bottom of build platform 1102 includes three sockets. Adjustable posts are inserted in the two sockets 1106 and 1108, which are herein referred to as front sockets. In some embodiments, 1106 and 1108 are not sockets but are instead connection regions where adjustable front posts are connected to the build platform 1102. The posts engaging with sockets 1106 and 1108 are adjustable height posts. In an example embodiment, the adjustable height posts are spring-locked posts.

In an example embodiment, socket 1104 is a pivot joint into which a ball end of a fixed-height post is insertable, and, in an example embodiment, from which the ball end is removable for removing the post from socket 1104. During an adjustment of the build platform 1102, the ball end of the post allows for the surface of the build platform to easily rotate, as necessary, based on the adjustable heights of the posts provided in sockets 1106 and 1108. In an example embodiment, the post insertable into socket 1104 is a fixed height post and is not adjusted before or during engagement with the build platform. In an alternative example embodiment, the fixed height post can be settable to one of varying heights prior to or during its engagement with the socket 1104. In such an example embodiment, the settable height can be changed using an extendable/retractable portion of the post. The height of the post having the ball end can be changed prior to insertion to a height selected based on user preference and or design needs.

Figure 12:
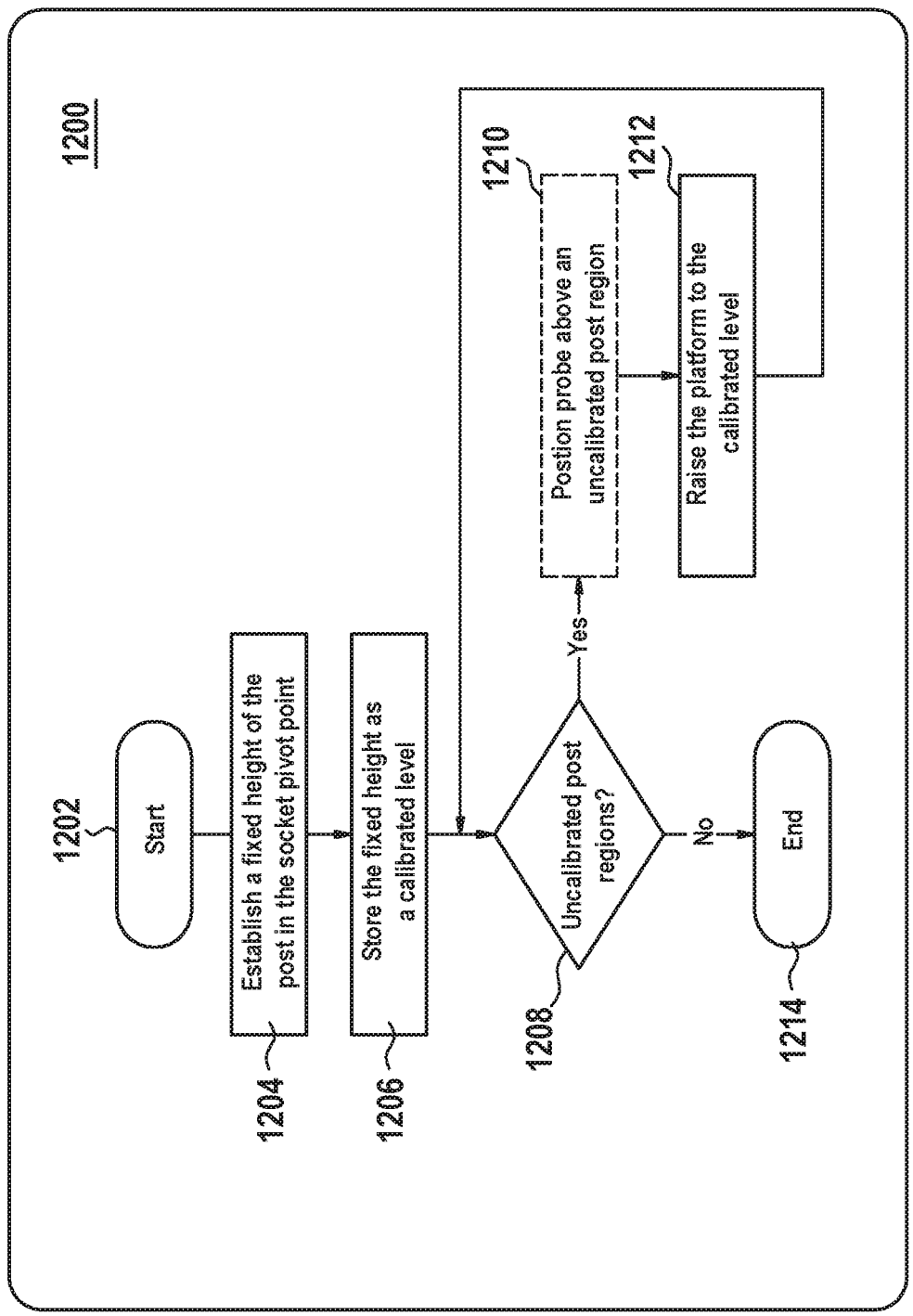
FIG. 12 is a flowchart that illustrates a method for two-point adjustment of a two-point leveling build platform according to an example embodiment of the present invention.

FIG. 12 is a flowchart that illustrates a process 1200 for two point adjustment of the two-point leveling build platform of FIG. 11, according to an example embodiment of the present invention.

At 1202, the process 1200 begins. In some embodiments, the process 1200 begins at 1202 upon a trigger such as a printer system start-up or upon a cue initiated by a user of the 3-D printer system. In some embodiments, the process 1200 begins at 1202 upon a new job being requested from the 3-D printer or upon a particularly classified type of new job being requested from the 3-D printer. For example, a new job classified as requiring a high degree of accuracy may automatically prompt process 1200 to begin at 1202.

After start, and at 1204, a fixed height of the post having a ball end in the socket pivot joint on the build platform is established. In some embodiments, the fixed height of the post is measured by the 3-D printing system. In an example embodiment, the sensor leveling system is implemented to establish the height of the post or the build platform above the post. In some embodiments, the fixed height of the post is determined by an entry provided by the user of the 3-D printing system at an input. For example, the user can enter a height of the post by using a touchscreen at the front of the device.

At 1206, the established fixed height is stored in the 3-D printing system as a calibrated level. In an example embodiment, the sensor leveling system is implemented to capture the calibrated level and to implement the calibrated level height at the other posts attached to the build platform, e.g., as described with respect to FIG. 10. The established fixed height of the post is stored in a memory element associated with the 3-D printer. For example, in an example embodiment, the established fixed height of the post is stored in the memory element associated with the processing device in the sensor leveling system. In another example embodiment, the established fixed height of the post is stored in a memory element outside of the sensor leveling system.

Once the fixed height is stored, it is determined whether any additional regions of the build platform associated with posts have not been calibrated. If no further posts require calibration, the process ends at 1214. If further posts do require calibration, the process may proceed according to optional 1210 and/or 1212. At 1210, the probe from the sensor leveling system is repositioned above another region of the build platform that is associated with a support post of the build platform. In an example embodiment, to position the probe, the entire probe housing is moved. The selection of which remaining and uncalibrated probe region should be calibrated next is selected by design. At 1212, the platform is one of raised or lowered to the calibrated level. If 1210 has been implemented, the deployed probe can assist with the adjustment of the platform to the calibrated level. Alternatively, the platform can be manually or automatically adjusted to the calibrated level at 1212.

Following 1212, it is determined again at 1208 whether any additional post regions remain that are uncalibrated. If no further posts require calibration, the process ends at 1214. If further posts do require calibration, the process may proceed again according to optional 1210 and/or 1212.

As noted herein, the adjustment of the height of the platform above the uncalibrated probe to the calibrated level can be executed by using the probe and sensor leveling system. For example, for each platform area needing adjustment, the probe is positioned above the uncalibrated post region. The platform is, at the selected uncalibrated post region, raised to the calibrated level by a series of periodic sensing measurements taken using the sensor leveling system. Once it is determined that the measured value has reached a reference measurement associated with the calibrated level, any remaining platform area needing adjustment is calibrated. A determination that the measured value is not yet at a reference measurement can be corrected using the fine tuning described with regard to FIG. 10. As necessary, the height of the post is fine-tuned either automatically or manually.

Figure 13:
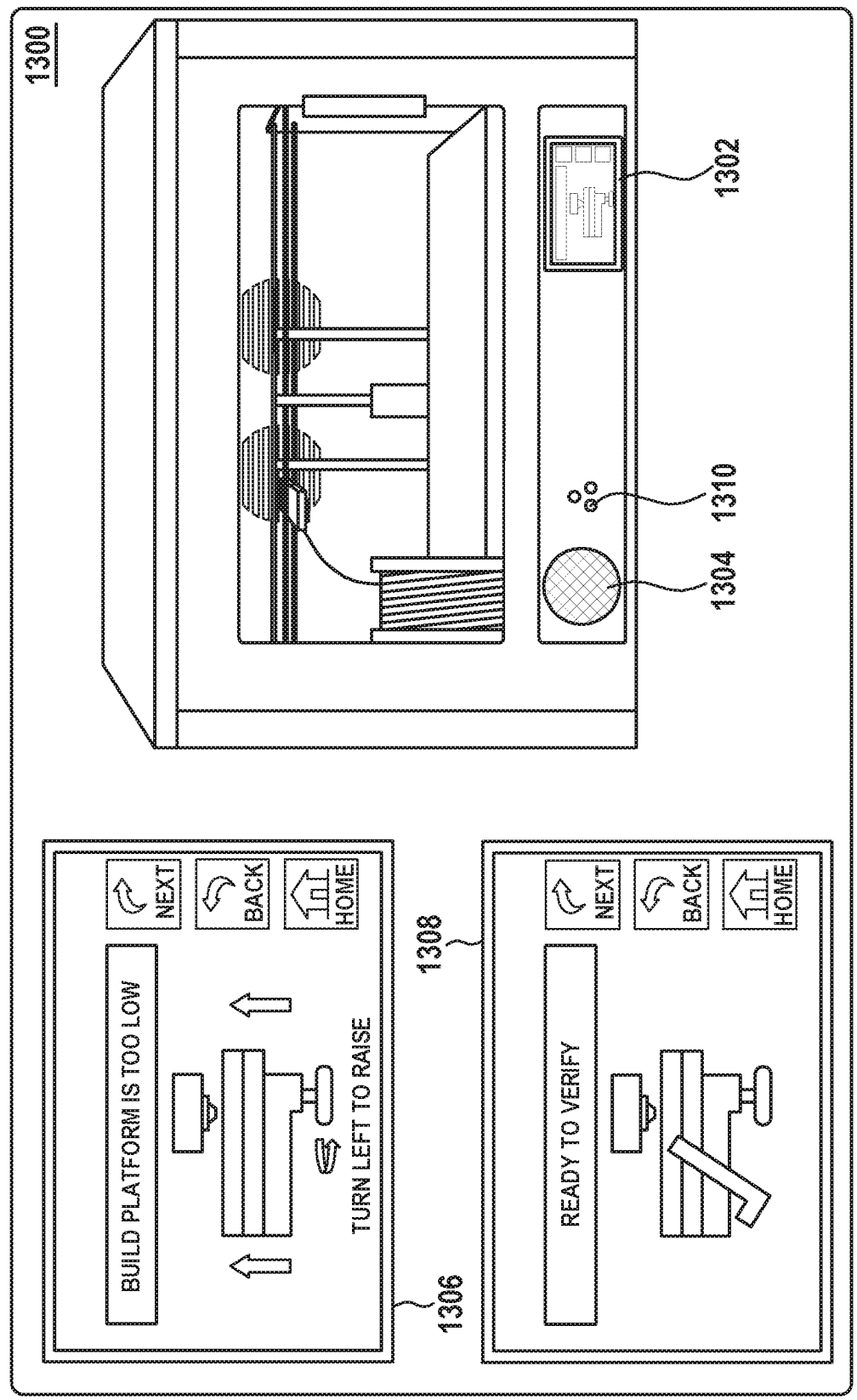
FIG. 13 is a front view of a build cage that includes a display configured to provide real-time feedback regarding a leveling state of a build platform according to an example embodiment of the present invention.

FIG. 13 is a front view 1300 of a build cage having a display used to provide real-time feedback regarding a leveling state of the build platform according to an example embodiment of the present invention.

Shown in the front view 1300 is a 3-D printer enclosed within a build cage. On the front of the build cage, different features provide to a user real-time feedback regarding a leveling state of the build platform. In an example embodiment, the front of the build cage includes a display screen 1302. In an example embodiment, the front of the build cage includes a speaker 1304. In some embodiments, as shown, both a speaker and a display screen are provided. The display screen 1302 shown is a touchscreen, but other non-touch screens, e.g., which may be associated with external mechanical buttons, could similarly be included on the 3-D printer.

Frames 1306 and 1308 include larger views of example data provided on the screen 1302 according to example embodiments of the present invention. For example, 1306 displays a notification to the user of the system that the build platform is too low and further demonstrates how a correction can be made. In an example embodiment, accompanying 1306 or independent of 1306, an audio message is provided to the user detailing similar and/or associated information via the speaker 1304. Frame 1308 displays another notification to the user of the system that the build platform and the system are prepared to engage in a leveling verification step. By selecting the portion of the screen that indicates "verify" any of the processes described herein to level the platform may be initiated.

In an example embodiment, the front of the build cage further includes an audio-in input, such as a microphone. An audio-in input is used to provide commands to the 3-D printer regarding initiation of the verification procedures or to request further instructions relating to leveling the build platform. Also as shown in 1306 and 1308, the screen indicates internet connectivity. Updates to the system relating to platform leveling and/or to obtaining and storing settings, as well as leveling usage rates, may be downloaded or stored as required.

Figure 14:
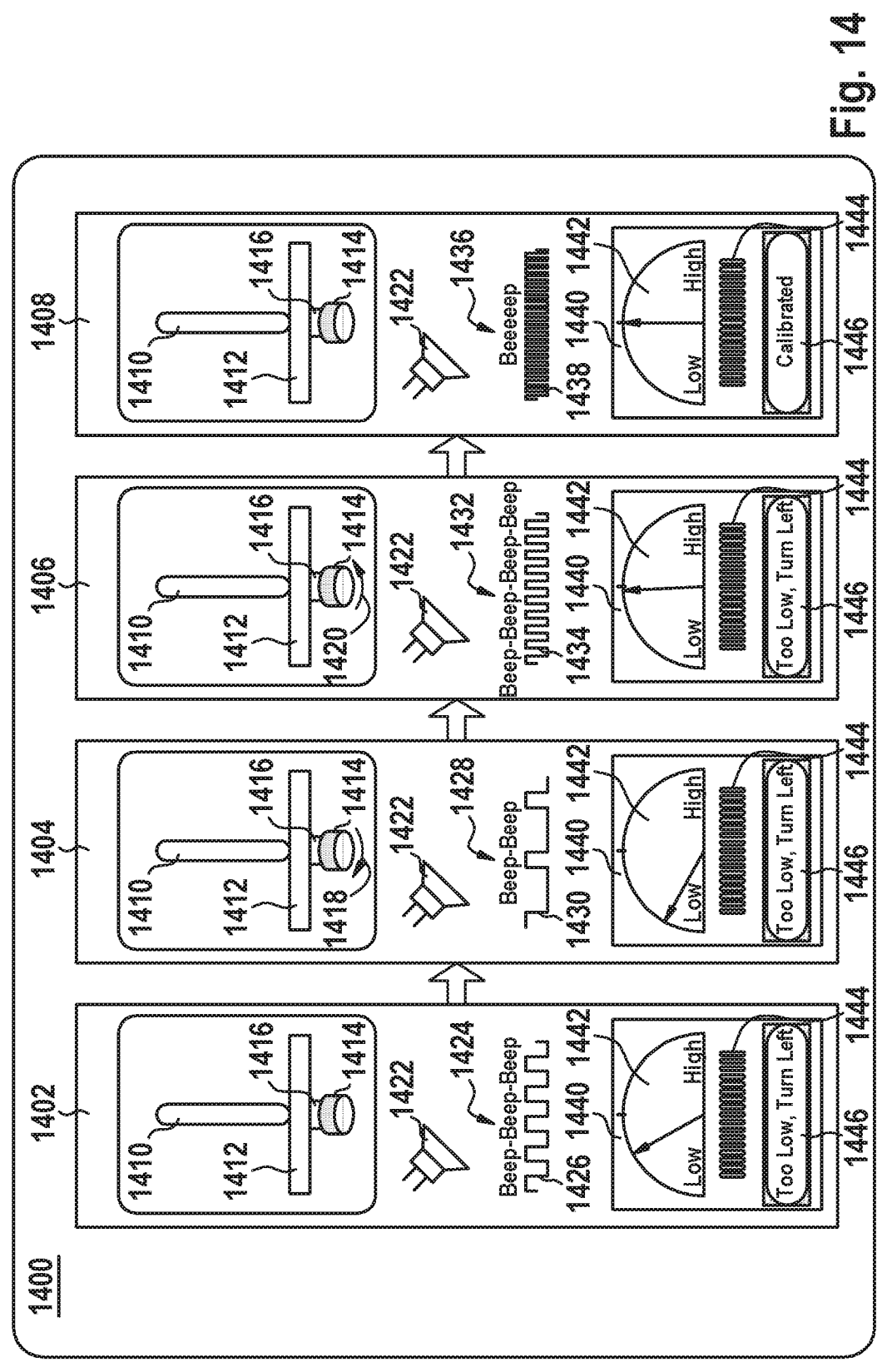

FIG. 14 is an example feedback timeline state diagram, including feedback options, regarding a leveling state of the build platform according to an example embodiment of the present invention. Example displays output during an adjustment flow 1400 of a 3-D build platform are shown.

In 1402, 1404, 1406, and 1408, a user attempts to adjust a build platform 1412 relative to a probe 1410 to ensure a level state of the build platform. To do so, the user manipulates an adjustment mechanism, such as knob 1414, which is connected via connection 1416 to the build platform 1412. By rotating knob 1414 in a first direction, the user raises build platform 1412. By rotating knob 1414 in a second direction, the user lowers build platform 1412.

In first stage 1402, the build platform system provides feedback regarding the leveling state of build platform 1412 relative to the probe 1410, which can help avoid or minimize the necessity of user trial and error. In an example embodiment, auditory feedback is provided by speaker 1422. The audio feedback provided, e.g., "Beep-Beep-Beep" 1424, indicates an accuracy of the leveling state of the build platform. For example, a period 1426 of an emitted tone ("Beep") indicates whether the build platform should be lowered or raised. In some embodiments, a pitch of the emitted tone is instead used to indicate whether the build platform should be lowered or raised. In an example embodiment, visual feedback is provided by a display 1440. The visual feedback provided is displayed in a readout form. The form of the readout of the visual display can be any of a variety of types, for example, in the form of: a meter 1442, a gauge 1444, or a text 1446. Such readouts 1442, 1444, and 1446 indicate the leveling state of the build platform in the first stage. In 1442, the indicator is non-centered and biased towards the "Low" side of the meter. Therefore, a user of 1442 should be aware that the leveling state of the platform 1412 is too low. In some embodiments, both the audio feedback and the visual feedback is provided.

In a second stage, 1404, the user makes an adjustment based on the feedback provided from stage 1402. The user of 1404, however, has made an adjustment 1418 that has lowered the platform 1412 when the platform was already placed too low. In response, the speaker 1422 provides audio feedback "Beep-Beep" 1428, which indicates a worsened leveling state relative to the previous position from 1402. For example, a period 1430 of an emitted tone ("Beep") has decreased in frequency. The reduction in frequency of the emitted tone from speaker 1422 indicates that the user should reverse the action exerted on knob 1414. Similarly, updated visual feedback is provided by a display 1440. The visual feedback provided, as shown in the figure, is displayed in a readout form, including 1442, 1444, and 1446, which indicates that the leveling state of the build platform has worsened relative to the first stage.

In a third stage, 1406, the user makes an adjustment based on the feedback provided from stage 1404. The user of 1406 has made an appropriate adjustment 1420 that has raised the platform 1412. In response, the speaker 1422 provides audio feedback "Beep-Beep-Beep-Beep" 1432, which indicates an improved leveling state relative to the previous position from 1404 (and relative to the previous position corresponding to 1402). For example, a frequency of the period 1434 of an emitted tone ("Beep") has increased. The frequent emitted tone from speaker 1422 (but prior to completion of the calibration) indicates that the user should continue the current action exerted on knob 1414. Similarly, updated visual feedback is provided by a display 1440, including updated 1442, 1444, and 1446 indicating that the leveling state of the build platform has improved relative to the second stage.

In a fourth stage, 1408, the user makes an adjustment based on the feedback provided from stage 1406. The user of 1408 has finished making adjustments that have leveled the build platform 1412 to the necessary height. In response, the speaker 1422 provides audio feedback "Beeeeeep" 1436, which indicates a completed leveling state is achieved. For example, a period 1438 of an emitted tone ("Beep") has an extremely high pitch. In some embodiments, the tone emitted upon achievement of a level state is varied from the tones emitted during the adjustment process. The tone, or the extremely high pitch of the emitted tone from speaker 1422 indicates that the user should not adjust knob 1414 any further. Similarly, updated visual feedback is provided by a display 1440 with stated of 1442, 1444, and 1446 indicating that the leveling state of the build platform has been reached.

Figure 15:
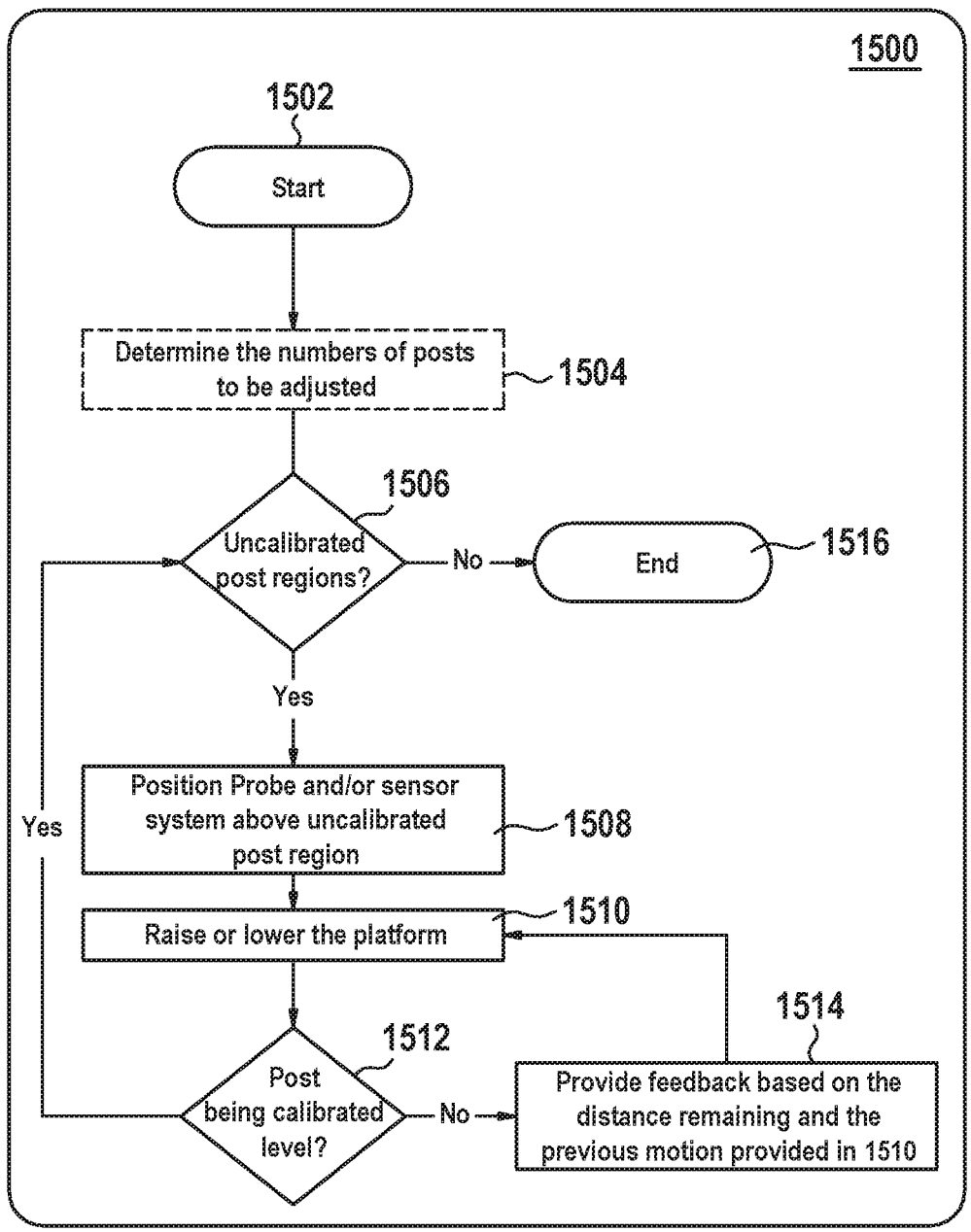
FIG. 15 is a flowchart that illustrates a method of providing real-time feedback regarding a leveling state of the build platform according to an example embodiment of the present invention.

FIG. 15 is a flowchart that illustrates a process 1500 of providing real-time feedback regarding a leveling state of the build platform according to an example embodiment of the present invention.

At 1502, the process 1500 begins. In some embodiments, the process 1500 begins at 1502 upon a trigger such as a printer system start-up or upon a cue initiated by a user of the 3-D printer system. In some embodiments, the process 1500 begins at 1502 upon a new job being requested from the 3-D printer or upon a particularly classified type of new job being requested from the 3-D printer. For example, a new job classified as requiring a high degree of accuracy may automatically prompt process 1500 to begin at 1502.

After start, and optionally at 1504, the number of posts to be adjusted is determined. In an example embodiment, the same number of posts is consistently provided for calibration (i.e., the build platform has 3 posts) and thus 1504 is skipped. At 1506, it is determined whether any regions of the build platform associated with posts have not been calibrated. If all posts were already calibrated, the process ends at 1516. If there are posts that do require calibration, the process proceeds with 1508. At 1508, the probe is repositioned above a region of the build platform that is associated with a support post of the build platform to be calibrated. In an example embodiment, to position the probe, the entire probe housing is moved. The selection of which remaining and uncalibrated probe should be calibrated next is selected by design.

At 1510, once the probe is repositioned, the user raises or lowers the build platform. At 1512, the level state of the post being calibrated is determined. In an example embodiment, it is determined whether the measured value from the sensor included in the sensor leveling system has reached the predetermined reference value. In an example embodiment, the measured value from the sensor leveling system is compared to the predetermined reference value. Until the predetermined reference threshold is reached, the platform continues to provide feedback to the user based on the measured values and the previous motion provided by the user in 1510. Following the provided feedback, the user again has the opportunity to raise or lower the build platform in 1510. Once the post has properly been calibrated by the user based on the provided feedback assistance, as shown in FIG. 13, the system determines whether any further posts required leveling state calibration.

The embodiments described above, which have been shown and described by way of example, and many of their advantages will be understood by the foregoing description, and it will be apparent that various changes can be made in the form, construction and arrangement of the components without departing from the disclosed subject matter or without sacrificing one or more of its advantages. Indeed, the described forms of these embodiments are merely explanatory. These embodiments are susceptible to various modifications and alternative forms, and the following claims are intended to encompass and include such changes and not be limited to the particular forms disclosed, but rather to cover all modifications, equivalents, and alternatives falling with the spirit and scope of this disclosure.

That is, the above description is intended to be illustrative, and not restrictive, and is provided in the context of a particular application and its requirements. Those skilled in the art can appreciate from the foregoing description that the present invention may be implemented in a variety of forms, and that the various embodiments may be implemented alone or in combination. Therefore, while the embodiments of the present invention have been described in connection with particular examples thereof, the general principles defined herein may be applied to other embodiments and applications without departing from the spirit and scope of the described embodiments, and the true scope of the embodiments and/or methods of the present invention are not be limited to the embodiments shown and described, since various modifications will become apparent to the skilled practitioner upon a study of the drawings, specification, and following claims. For example, components and functionality may be separated or combined differently than in the manner of the various described embodiments, and may be described using different terminology. These and other variations, modifications, additions, and improvements may fall within the scope of the disclosure as defined in the claims that follow.

What is claimed is:

1. A leveling system for adjusting a level state of a platform of a three-dimensional printer, the leveling system comprising:
   a build cage;
   a platform that includes at least one socket in a bottom surface of the platform;
   at least three posts, each supporting the platform at a respective height off of a floor of the build cage, and each extending from a respective first end thereof, at which the respective post is connected to a bottom side of the platform, to a respective second end thereof, wherein a respective height of each of the at least three posts is adjustable; and
   an adjusting component that is configured to connect the at least three posts to each other, lock the respective heights of the posts, and release the posts for adjustment of their respective heights;
   wherein:
      two of the at least three posts are front posts and one of the at least three posts is a rear post;
      the adjusting component includes:
         (i) a first arm that has a first end connected to a first one of the front posts and a second end connected to the rear post; and
         (ii) a second arm that has a first end connected to a second one of the front posts and a second end connected to the rear post;
      the front posts are proximate to a front side of the platform and the rear post is proximate to a rear side of the platform;
      each of the first arm and the second arm is configured to apply a frictional force to:
   (i) a respective one of the front posts, and (ii) the rear post;
      at least one of the posts is an adjustable post whose height is adjustable while connected to the platform; and
      at least one of the posts is a fixed post whose height is non-adjustable while the fixed post is connected to the platform, and that includes a ball pivot joint configured to engage with the at least one socket.

2. The leveling system of claim 1, further comprising:
   a probe housing; and
   a probe protruding from the probe housing, wherein:
      the at least one adjustable post includes a plurality of adjustable posts;
      the probe housing is configured to be shifted for sequentially centering the probe above respective ones of the plurality of adjustable posts; and
      the leveling system is configured to, using the probe, calibrate the platform to a level state in a plane established by a height of the at least one fixed post.

3. The leveling system of claim 1, wherein the adjusting component is configured to adjust the height of the at least one adjustable post to be at a same height as the height of the at least one fixed post, the adjusting component being configured to compress and expand the at least one adjustable post for effecting the height adjustment.

4. The leveling system of claim 3, wherein the first arm and the second arm each includes a respective lever handle, and each is configured to apply a force to a respective one of the adjustable posts.

5. The leveling system of claim 4, wherein a spring elastically connects the first arm to the second arm in a horizontal direction, and each of the adjustable posts is spring loaded in a vertical direction.

6. A build platform of a three-dimensional printer, the build platform comprising:
   a platform;
   at least three posts that each extends from a respective first end thereof, at which the respective post is connected to a bottom side of the platform, to a respective second end thereof, wherein a respective height of each of the at least three posts is adjustable; and
   an adjusting component that is configured to connect the at least three posts to each other, lock the respective heights of the posts, and release the posts for adjustment of their respective heights;

wherein:
two of the at least three posts are front posts and one of the at least three posts is a rear post;
the adjusting component includes:
(i) a first arm that has a first end connected to a first one of the front posts and a second end connected to the rear post; and
(ii) a second arm that has a first end connected to a second one of the front posts and a second end connected to the rear post;
the front posts are proximate to a front side of the platform and the rear post is proximate to a rear side of the platform; and
each of the first arm and the second arm is configured to apply a frictional force to:
(i) a respective one of the front posts, and (ii) the rear post.

7. The build platform of claim 6, wherein each of the first arm and the second arm is connected to the bottom side of the platform at a respective pivot point and by a respective pin.

8. The build platform of claim 6, wherein the at least three posts are each spring loaded in a vertical direction.

9. The build platform of claim 6, wherein a spring elastically connects the first arm to the second arm.

10. The build platform of claim 6, wherein each of the first arm and the second arm includes a respective lever handle.

11. A method for adjusting a build platform of a three-dimensional printer to a level state, wherein the build platform comprises: a platform; at least three posts that each extends from a respective first end thereof, at which the respective post is connected to a bottom side of the platform, to a respective second end thereof, wherein a respective height of each of the at least three posts is adjustable; and an adjusting component that is configured to connect the at least three posts to each other, lock the respective heights of the posts, and release the posts for adjustment of their respective heights; wherein: two of the at least three posts are front posts and one of the at least three posts is a rear post; the adjusting component includes: (i) a first arm that has a first end connected to a first one of the front posts and a second end connected to the rear post; and (ii) a second arm that has a first end connected to a second one of the front posts and a second end connected to the rear post; the front posts are proximate to a front side of the platform and the rear post is proximate to a rear side of the platform; and each of the first arm and the second arm is configured to apply a frictional force to: (i) a respective one of the front posts, and (ii) the rear post, the method comprising:
sequentially calibrating, by a processing device, each of the at least three posts supporting the build platform in a build cage of the printer to the level state; and
during the calibrating, providing, by a feedback device coupled to the processing device, feedback indicating one of: an instruction to a user to assist in the calibrating and a progress report to the user regarding the level state.

12. The method of claim 11, wherein the calibrating includes:
lowering the build platform;
for each of the at least three posts:
adjusting a probe to a respective location in the build cage that is above a respective portion of the build platform associated with the respective post; and
incrementally:
raising the build platform at the respective location;
measuring, by a sensor, a characteristic of the probe; and
comparing, by the processing device, the measured characteristic obtained from the sensor to a predetermined characteristic; and
separately setting, by stopping the incremental raising, a respective height of each of the at least three posts based on the comparison of the characteristic of the respective probe to the predetermined characteristic.

13. The method of claim 12, wherein the sensor is a linear optical sensor.

14. The method of claim 11, wherein the feedback is provided by the build cage in an audio or visual form on the display device.

15. The method of claim 11, wherein, after calibration of a first one of the at least three posts, the calibration of the other ones of the at least three posts is based on a height to which the first one of the at least three posts had been calibrated.

16. The method of claim 11, wherein the level state is determined for the build platform relative to an extruder head of the printer.

* * * * *